US008417513B2

(12) United States Patent
Prompt et al.

(10) Patent No.: US 8,417,513 B2
(45) Date of Patent: Apr. 9, 2013

(54) REPRESENTATION OF OBJECTS AND RELATIONSHIPS IN DATABASES, DIRECTORIES, WEB SERVICES, AND APPLICATIONS AS SENTENCES AS A METHOD TO REPRESENT CONTEXT IN STRUCTURED DATA

(75) Inventors: Michel Prompt, Novato, CA (US); Claude Yves Martin Samuelson, Novato, CA (US)

(73) Assignee: Radiant Logic Inc., Novato, CA (US)

( * ) Notice: Subject to any disclaimer, the term of this patent is extended or adjusted under 35 U.S.C. 154(b) by 1078 days.

(21) Appl. No.: 12/134,841

(22) Filed: Jun. 6, 2008

(65) Prior Publication Data
US 2009/0306963 A1 Dec. 10, 2009

(51) Int. Cl.
*G06F 17/27* (2006.01)
(52) U.S. Cl.
USPC .................. 704/9; 704/7; 704/8; 704/10
(58) Field of Classification Search .......... 704/2–10
See application file for complete search history.

(56) References Cited

U.S. PATENT DOCUMENTS

| 5,696,916 | A | * | 12/1997 | Yamazaki et al. ............ 715/853 |
|---|---|---|---|---|
| 6,028,602 | A | | 2/2000 | Weidenfeller et al. |
| 6,088,671 | A | * | 7/2000 | Gould et al. ................... 704/235 |
| 6,167,370 | A | * | 12/2000 | Tsourikov et al. ................ 704/9 |
| 6,208,993 | B1 | | 3/2001 | Shadmon |
| 6,493,717 | B1 | | 12/2002 | Junkin |
| 6,985,905 | B2 | | 1/2006 | Prompt et al. |
| 7,225,249 | B1 | | 5/2007 | Barry et al. |
| 8,150,676 | B1 | * | 4/2012 | Kaeser ............................. 704/1 |
| 2002/0042707 | A1 | * | 4/2002 | Zhao et al. ....................... 704/9 |
| 2004/0073548 | A1 | | 4/2004 | Lim et al. |
| 2004/0088158 | A1 | | 5/2004 | Sheu et al. |
| 2004/0205040 | A1 | * | 10/2004 | Yoshioka et al. ............... 706/50 |
| 2006/0005228 | A1 | * | 1/2006 | Matsuda ........................... 726/1 |
| 2006/0154218 | A1 | * | 7/2006 | Tokuda et al. ................ 434/169 |
| 2006/0178868 | A1 | | 8/2006 | Billerey-Mosier |
| 2006/0200337 | A1 | * | 9/2006 | Cipollone et al. ................ 704/4 |

OTHER PUBLICATIONS

PCT International Search Report and Written Opinion, PCT Application No. PCT/US09/45980, Jul. 17, 2009, 8 pages.
Davidson, S.B. et al., "K2/Kleisli and GUS: Experiments in Integrated Access to Genomic Data Sources," IBM Systems Journal, 2001, pp. 512-531, vol. 40, No. 2.
U.S. Appl. No. 11/180,318.
U.S. Appl. No. 11/328,664.
Michel Prompt, *The Second Wave: Linking Identities to Contexts*, Digital ID World, Apr. / May 2005, pp. 74-79.
European Extended Search Report, European Application No. 09759249.7, Aug. 17, 2012, 6 pages.

\* cited by examiner

*Primary Examiner* — Leonard Saint Cyr
(74) *Attorney, Agent, or Firm* — Fenwick & West LLP

(57) ABSTRACT

Systems and methods are disclosed for tagging and translating database objects and relationships into sentences. The successive composition of these sentences form hierarchies which encode contextual information about the objects. A virtual directory/context server functions using a common abstraction layer to access data from databases, applications, directories, Web Services, and other data sources within the enterprise. The virtual directory/context server includes a sentence/context builder module that enables the translation or relationships between data and from the plurality of data sources into a human-readable form, for example, an English language sentence. Thus, applications can view, access, and/or modify the data from the data sources of the enterprise through the virtual directory/context server, for example, using the sentences representative of the relationships between the data. The sentences are indexed, which allows for searches that bring information not only about objects, but also about the context in which those objects appear.

29 Claims, 21 Drawing Sheets

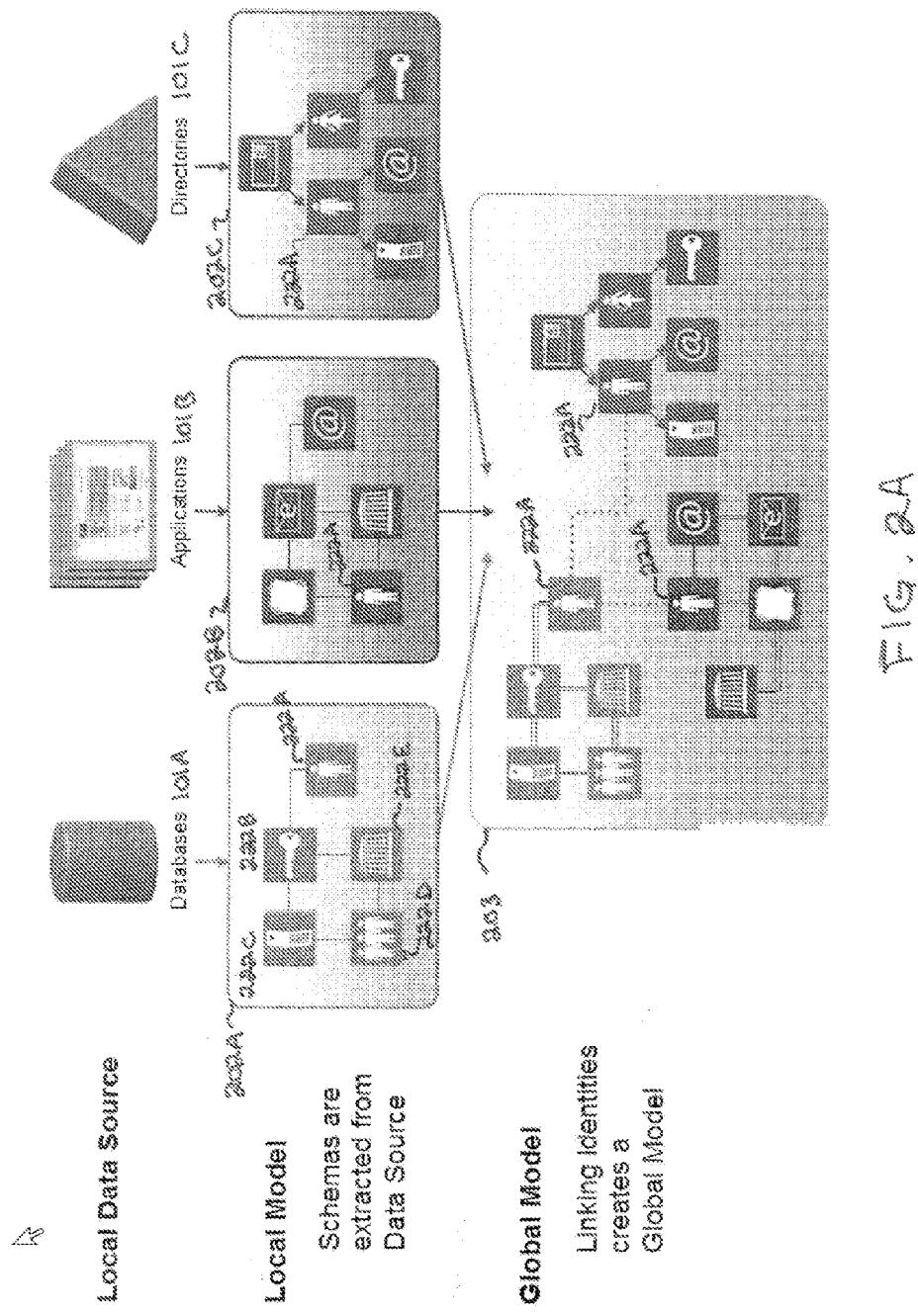

Filter: [(customerid=alfk*) ~1717

Search ~1718

Your search for (customerid=alfk*) has returned the following results

Contexts found ~1720
Customer Alfreds Futterkiste
Customer Alfreds Futterkiste has placed Order 10643
Customer Alfreds Futterkiste has placed Order 10692
Customer Alfreds Futterkiste has placed Order 10702
Customer Alfreds Futterkiste has placed Order 10835
Customer Alfreds Futterkiste has placed Order 10952
Customer Alfreds Futterkiste has placed Order 11011
Employee Nancy Davolio has sold Product Grandma's Boysenberry Spread to the Customer Alfreds Futterkiste
Employee Nancy Davolio has sold Product Original Frankfurter grüne Soße to the Customer Alfreds Futterkiste
Employee Nancy Davolio has sold Product Raclette Courdavault to the Customer Alfreds Futterkiste
Employee Nancy Davolio has sold Product Rössle Sauerkraut to the Customer Alfreds Futterkiste
Employee Janet Leverling has sold Product Escargots de Bourgogne to the Customer Alfreds Futterkiste
Employee Janet Leverling has sold Product Flotemysost to the Customer Alfreds Futterkiste
Employee Margaret Peacock has sold Product Aniseed Syrup to the Customer Alfreds Futterkiste
Employee Margaret Peacock has sold Product Lakkalikööri to the Customer Alfreds Futterkiste
Employee Margaret Peacock has sold Product Vegie-spread to the Customer Alfreds Futterkiste
Employee Michael Suyama has sold Product Chartreuse verte to the Customer Alfreds Futterkiste
Employee Michael Suyama has sold Product Rössle Sauerkraut to the Customer Alfreds Futterkiste
Employee Michael Suyama has sold Product Spegesild to the Customer Alfreds Futterkiste 19 entries found...

FIG. 17

REPRESENTATION OF OBJECTS AND RELATIONSHIPS IN DATABASES, DIRECTORIES, WEB SERVICES, AND APPLICATIONS AS SENTENCES AS A METHOD TO REPRESENT CONTEXT IN STRUCTURED DATA

CROSS-REFERENCE TO RELATED APPLICATION(S)

This application is related to U.S. Pat. No. 6,985,905, issued Jan. 10, 2006, entitled "System And Method For Providing Access To Databases Via Directories And Other Hierarchical Structures and Interfaces," and U.S. patent application Ser. Nos. 11/180,318, filed Jul. 12, 2005 and 11/328,664, filed Jan. 9, 2006, both entitled "System And Method For Providing Access To Databases Via Directories And Other Hierarchical Structures and Interfaces." The subject matter of all of the foregoing is incorporated herein by reference in their entirety.

BACKGROUND OF THE INVENTION

1. Field of the Invention

This invention relates to systems and methods of accessing diverse databases, directories, Web Services and applications with a published API (application programming interface) via a common access layer.

2. Description of the Related Art

It is well known in computer science that tables and their relationships in a relational database have an equivalent representation as a subset of formal mathematic logic referred to as predicate logic or first order logic. This observation extends to any system of objects and relationships such as Web Services, applications with a published API, or directories. In fact, much of the information contained in data sources across an enterprise infrastructure only makes sense in the context of the relationships between data objects. However, efforts to grasp the context of the data are hindered by the heterogeneity of diverse data sources, access protocols (SQL, LDAP, Web Services, APIs) with different data models and different implicit or explicit metadata buried inside different applications domains throughout the enterprise.

One attempt to bridge between diverse data sources relies on virtual directory technology. Virtual directory technology can abstract existing data sources such as databases, directories, and applications, and can integrate them into a common access layer. Any existing system of data sources can be represented by a model, i.e., a set of relationships between the core objects. By exploiting virtualization to build a common abstraction layer
  for objects,
  for the relationships between objects, and
  the properties inside each object (as a set of binary relationships between the object identity and its attributes or properties),
one can create a general global model of the data.

What are needed are improved systems and methods for representing the context of data derived from diverse data sources.

SUMMARY OF THE INVENTION

The present invention provides systems and methods for tagging and translating database objects and relationships into sentences. The successive composition of these sentences form hierarchies which in turn encode contextual information about the objects.

In one embodiment, a virtual directory/context server functions using a common abstraction layer to access data from databases, applications, directories, Web Services, and other data sources within the enterprise. In one embodiment, the virtual directory/context server includes a sentence/context builder module. The sentence/context builder module enables the translation of relationships between data from the plurality of data sources into a human-readable form, for example, an English language sentence. Thus, applications can view, access, and/or modify the data from the data sources of the enterprise through the virtual directory/context server, for example, using the sentences representative of the relationships between the data. The sentences are indexed, which allows for searches that bring information not only about objects, but also about the context in which those objects appear. Finally, the sentences and contexts can be externalized, or "serialized" in computer parlance, using different formats, for example XML Schema and Semantic web Resource Description Framework (RDF) sentence format.

Other aspects of the invention include a user interface that allows the creation of sentence templates by the user and methods corresponding to the systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 2A is an illustration of the extraction of schemas/metadata from local or application domain specific data sources that are then translated into the global model, in accordance with an embodiment of the present invention.

FIG. 6 is an illustration of a user interface including a window for selecting attributes from a selected table or any virtualized object (We Service, Application, or API), in accordance with an embodiment of the present invention.

FIG. 12 is another illustration of the user interface including the directory view designer (sentence/context builder) and the path selection window in FIG. 5, in accordance with an embodiment of the present invention.

FIG. 17 is an illustration of instantiated sentences returned as results from a keyword search, in accordance with an embodiment of the present invention.

Figure 1:
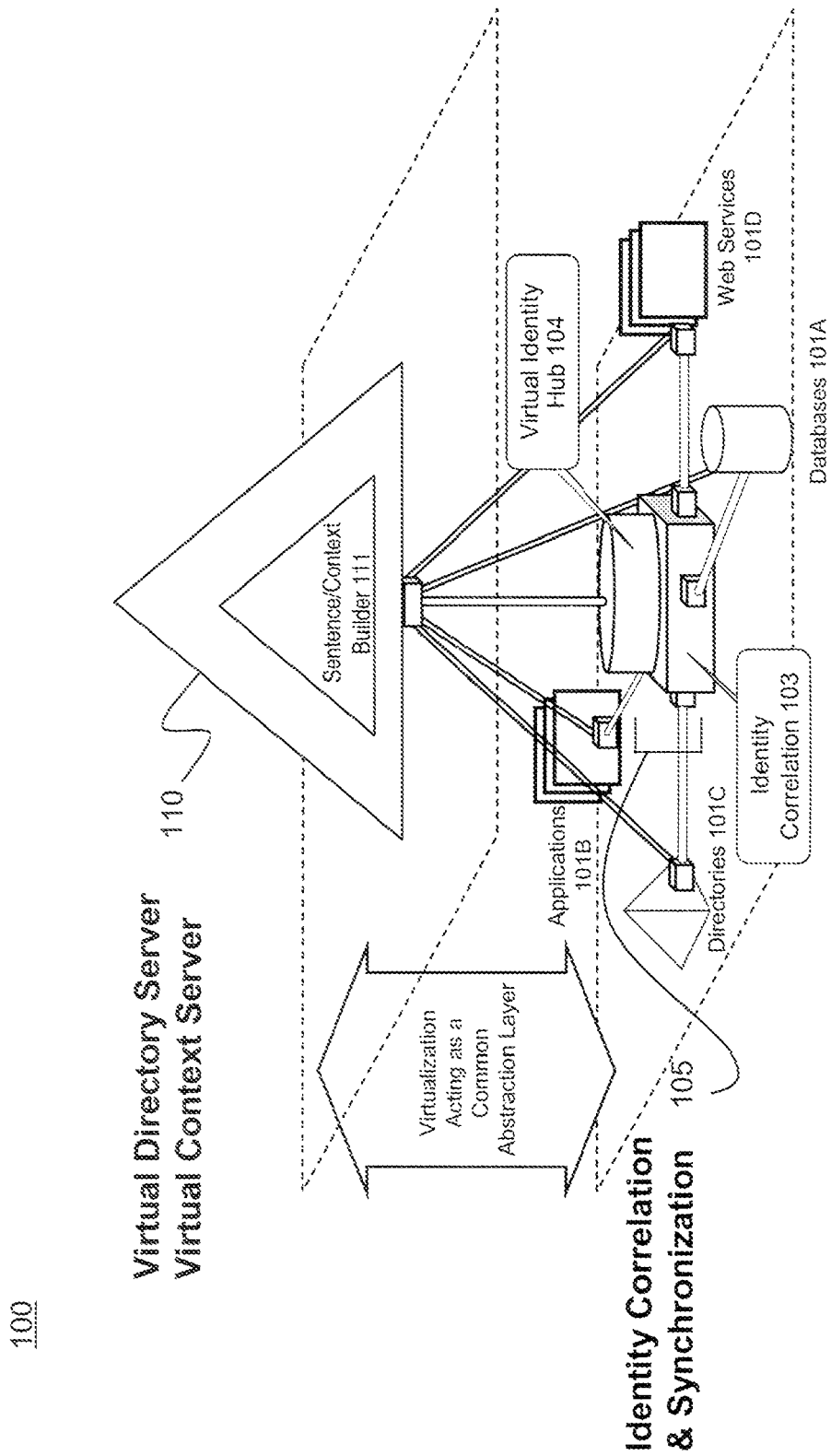
FIG. 1 is an illustration of an enterprise architecture that includes a sentence/context builder within the virtual directory/context server, in accordance with an embodiment of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The present invention provides systems and methods for tagging and translating database objects and relationships into sentences. By exploiting virtualization to build a common abstraction layer, a general global data model can be created. Out of this global data model, a navigation in the graph of relationships can generate sentences that can in turn be regrouped in context. By providing the support for a semantic tagging of links in a hierarchical tree structure, one can represent sentences and regroup them by relevant theme to extract contextual information out of what once were separate applications.

In one embodiment, the general form of a sentence is "subject verb object", but in other embodiments the verb could be replaced by another arbitrary grammatical construct assigned by the user of the system. In still other embodiments, other orders of the parts of the sentence are also possible. In most cases, the sentences are formed by choosing in the global model of all data sources all of the following:

- A source object (or any property/attribute of any source object): this object acts as the subject of the sentence.
- A target object that is related to the source object: this object will act as the object of the sentence. In one embodiment, the target object belongs to the same application domain/data source or any other application domain as long as a relationship or a chain of relationships exists between the source object and the target object.
- A user defined label (a semantic tag) attached to the link/relationship between the source object and the target object. This label acts as the verb of the sentence (or adjective or grammatical category assigned by the user). The link/relationship is preferably oriented (an oriented graph) from subject to object. A reverse link would generally have a different semantic tag with a different (inverse) verb.

Creating a context means mounting the sentences under a user defined arbitrary label to describe a specific situation, background, context, etc. A set of increasingly specific sentences about any subject can be built if relationships exist between those respective subjects and objects in the following manner (i.e., if the subjects and objects form any connected oriented graph):

Subject(A) verb1 Object(B). Subject(B) verb2 Object(C). Subject(C) verb3 Object(D) . . . . Subject(X) verb24 Object(Y). Subject(Y) verb25 Object(Z).

In this generic example, the sentence "Subject(B) verb2 Object(C)" gives more precision about the sentence "Subject (A) verb1 Object(B)" by giving more details about (B). For example: Customer(Laura) bought a Car(Toyota). A Car (Toyota) was delivered by Dealer(Joe). Dealer(Joe) is located in City(Oakland) . . . .

Navigating a context means choosing an object and reading the sentences formed by the relationships that exist within a data source and between data sources. Thus, each data source can contribute many specific contexts to a global enterprise/organization context tree.

FIG. 1 is an illustration of an enterprise architecture 100 that includes a sentence/context builder 111 within the virtual directory/context server 110, in accordance with an embodiment. As shown in FIG. 1, data from a variety of data sources, including databases 101A, applications 101B, directories 101C, and Web Services 101D is correlated and synchronized by an identity correlation and synchronization module ("ICS") 105. The ICS 105 comprises an identity correlation module 103 and a virtual identity hub 104. The identity correlation module 103 eliminates duplicates by correlating information that refers to the same entity using any technique known to those of skill in the art. The virtual identity hub 104 comprises a set of database tables and business rules that the identity correlation module 103 uses to establish correlation. The virtual identity hub 104 creates and stores the global links for those identities that have been established as correlated per the business rules.

The virtual directory/context server 110 functions using a common abstraction layer to access data from the databases 101A, applications 101B, directories 101C, Web Services 101D, and other data sources within the enterprise 100. The operation of a suitable virtual directory server is described in U.S. Pat. No. 6,985,905, issued Jan. 10, 2006, entitled "System And Method For Providing Access To Databases Via Directories And Other Hierarchical Structures and Interfaces," which has been incorporated by reference.

In one embodiment, the virtual directory/context server 110 includes a plurality of modules, including a sentence/context builder module 111. The sentence/context builder module 111, which is described in further detail below, enables the translation of relationships between data from a plurality of data sources 101A-D into a human-readable form, for example, an English language sentence or a sentence in another language. Thus, applications can view, access, and/or modify the data from the data sources 101A-D of the enterprise 100 through the virtual directory/context server 110, for example, using the sentences representative of the relationships between the data.

FIG. 2A is an illustration of the extraction of schemas from data sources 101A-C to form local models 202A-C. As shown in FIG. 2A, the local models are illustrated as connections between square icons, for example icons 222A-E that each represents a data object. Each connection represents a relationship between two data objects that exists in the data source 101A. As has been described, for example in U.S. Pat. No. 6,985,905, issued Jan. 10, 2006, entitled "System And Method For Providing Access To Databases Via Directories And Other Hierarchical Structures and Interfaces," which has been incorporated by reference, a schema manager is used to extract the schema and detect all relationship that exist between the data objects stored in a data source.

Once the local models 202A-C have been formed, a global model 203 can be created by linking a data object, for example object 222A across local models by recognizing that a data object as represented in two or more local models actually refer to the same entity or identity. As shown in FIG. 2A, sometimes the same objects/entities can be differently represented in different data sources. Within the enterprise, there is often more than one definition of an entity, and while they share some common attributes, they can differ considerably and are not interchangeable. In one embodiment, the translation of the local models 202A-C into the global model 203 is facilitated by the presence of a common unique identifier of the object 222A within the local models 202A-C. In other implementations, the translation of the local models 202A-C into the global model 203 relies on the operation of ICS 105 programmed to correlate objects despite the lack of a common unique identifier across local models 202A-C. For example, in FIG. 2A, the icons representing a person 222A could be instances of the same person with a different set of identifiers which are specific to each application domain. In this case, before a set of links between different representations of an entity can be made, it is sometimes needed to establish a correlation between these different identities and create a "union" of those identities. This operation is performed by the identity correlation module 103 in cooperation with the virtual identity hub 104 as described above. Once those identities are linked into a table by the ICS 105, this table is virtualized and added to the global model. In turn, the new table acts as a bridge (as a union of identities) between objects in the different segregated application domains. As a result, a new path exists between each previously segregated application domain, and sentences can then be created across these application domains.

Figure 2B:
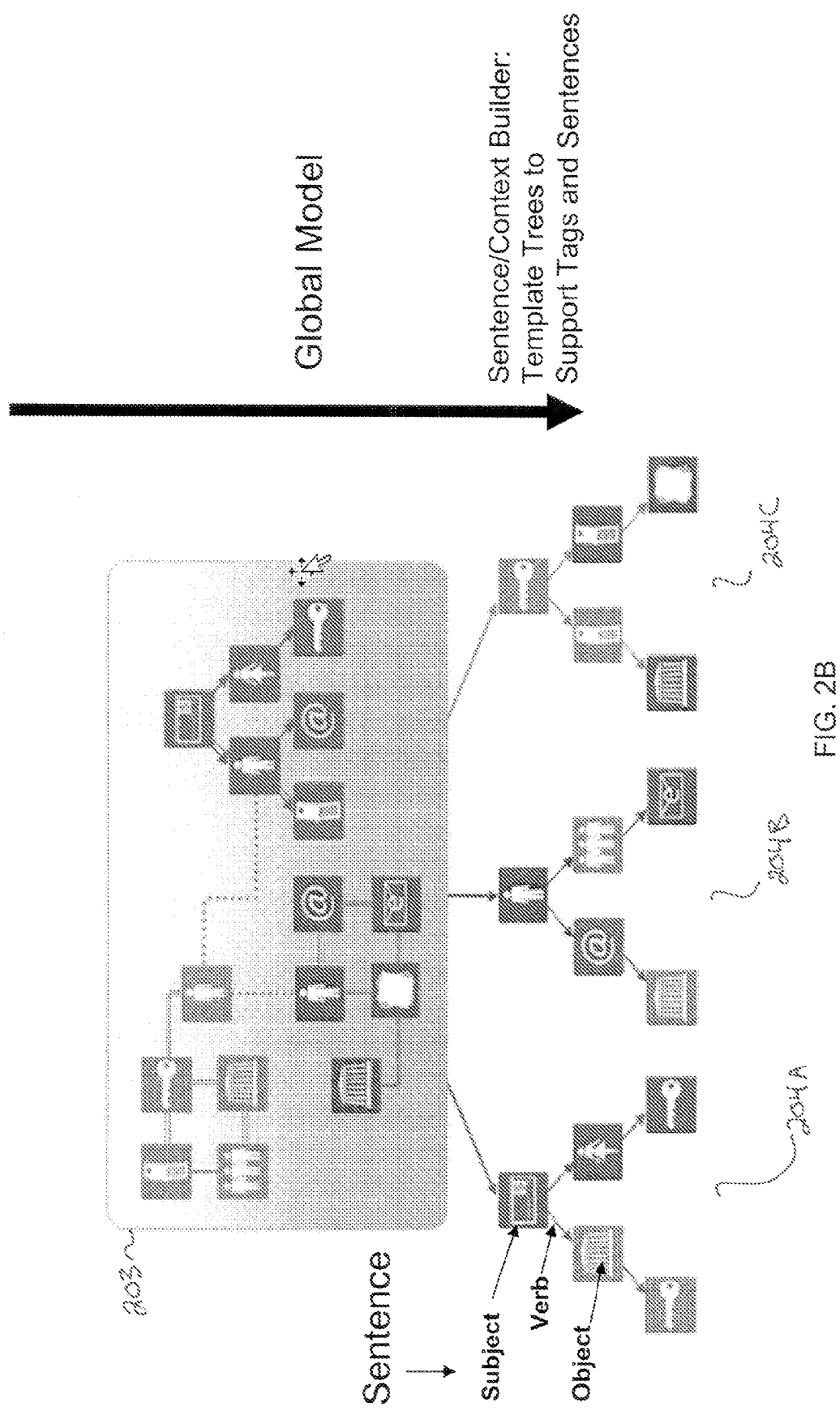
FIG. 2B is an illustration of the translation of the global model to template trees and support tags and sentences, in accordance with an embodiment of the present invention.

FIG. 2B is an illustration of the translation of the global model 203 to template trees to support tags and sentences, in accordance with an embodiment of the present invention. A tree structure, such as a directory, is a valuable way to represent and discover context. In such a tree structure, objects are implicitly represented in sentences through their relationships. It is desirable to move from the object oriented model to a declarative sentence oriented model where objects are defined in sentences through their associations/relationships.

From the global model 203, the sentence/context builder 111 enables the creation of template trees that are derived from the relationships in the global model. Examples of template trees 204A-C are shown in FIG. 2B. It is within the template trees 204A-C that the parts of a sentence can be tagged. As will be described in further detail below, in one embodiment, an object is selected as the subject of a sentence, a related object is selected as the object of the sentence, and the relationship between them is tagged as a verb that describes the relationship.

Figure 2C:
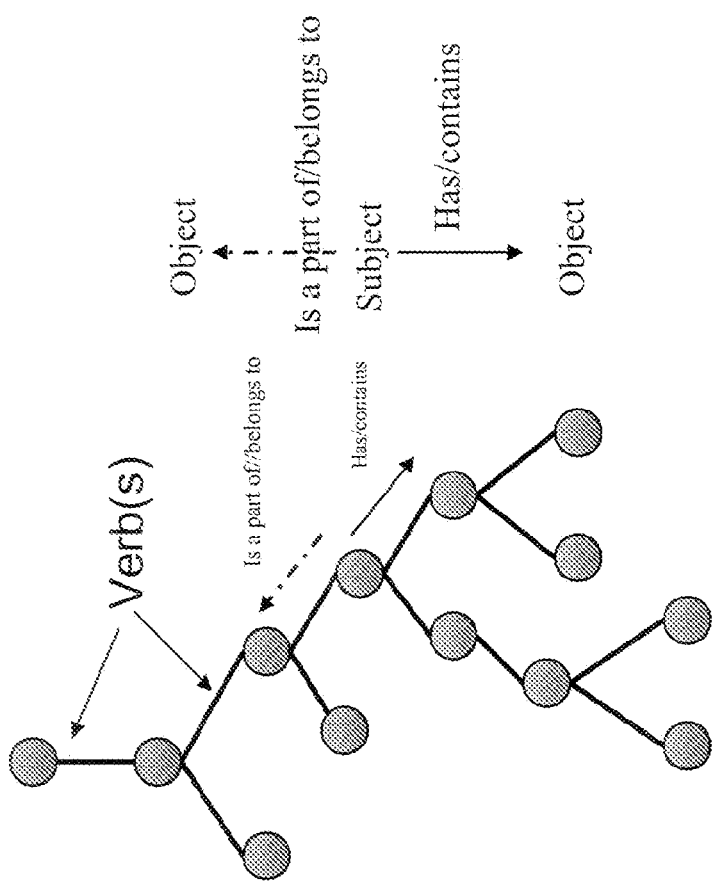
FIG. 2C is an illustration of a tree as a way to represent sentences, in accordance with an embodiment of the present invention.

FIG. 2C is a further illustration of a tree as a way to represent sentences. A tree is a natural way to express many kinds of relationships and associations. For example, a tree can represent a 1:n relationship, an "is_a" relationship (specialization/subtyping), a "has-a" relationship (an object belongs to another object), or a parent/child/container relationship. The directionality of the traversal of the tree impacts the type of relationship that is described. Whereas a subject "belongs to" an object above it in the tree, the same subject "contains" an object below it in the tree. Examples of these relationships are shown in FIG. 2C.

Figure 2D:
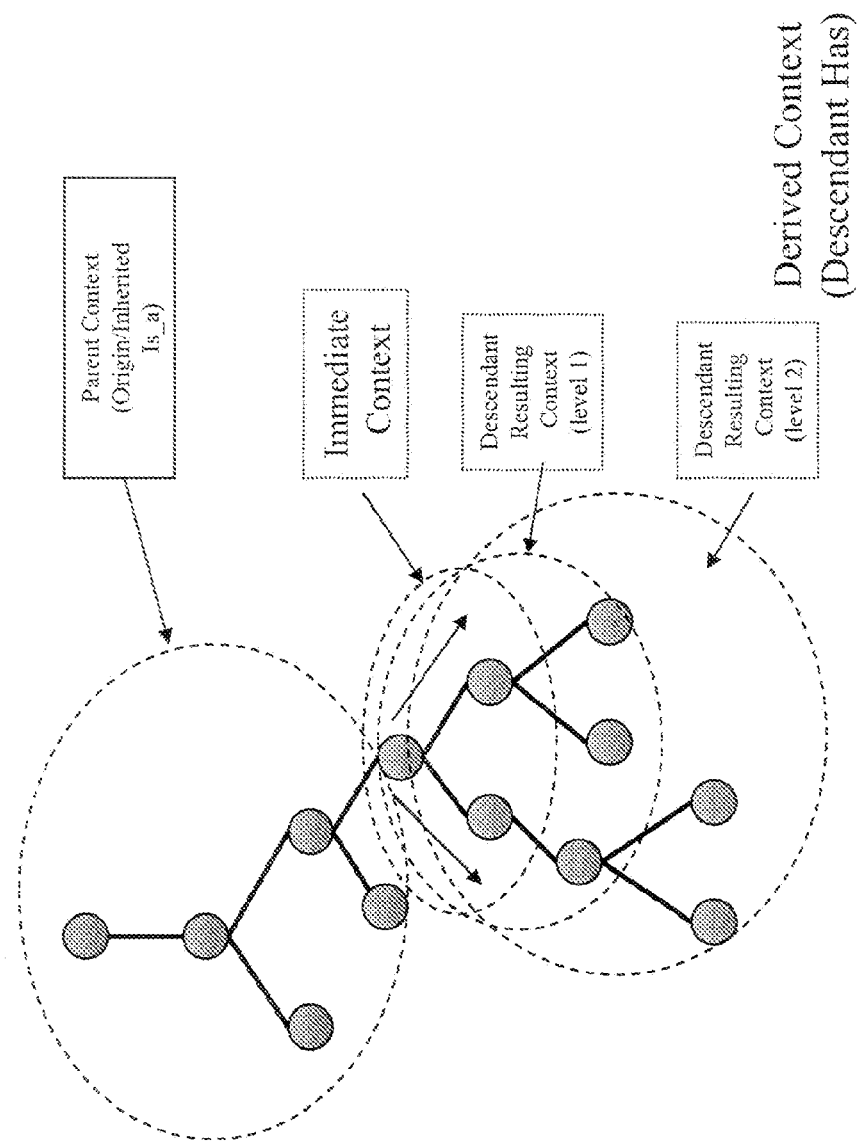
FIG. 2D is an illustration of a tree as a way to represent sentences and contexts, in accordance with an embodiment of the present invention.

FIG. 2D is an illustration of a tree as a way to represent sentences and contexts. In the English language, the word "context" generally has two meanings: 1. The parts of a sentence, paragraph, or discourse immediately next to or surrounding a specified word or passage and determining its exact meaning; 2. The whole situation, background or environment relevant to a particular event, personality, creation, etc. As used herein, the word "context" has both of the above meanings. FIG. 2D illustrates that through the tree structure, the immediate context is the objects and relationships immediately next to an object. However, the whole situation or environment relevant to an object can be ascertained by examining a larger portion of the tree surrounding the object, such as various levels of descendant resulting contexts. Thus, trees are a way to represent both immediate contexts as well as the larger environmental contexts of objects in the tree.

From the foundation of the global model that shows a map of data objects and relationships between those objects that can be organized hierarchically, it is possible to derive sentences that are both simplistic enough to be computerized and comprehensible enough to be readable by a user as English (or another human-readable language). Thus, the sentences become an efficient mechanism to pull meaning from complicated inter-relationships among data.

Figure 3:
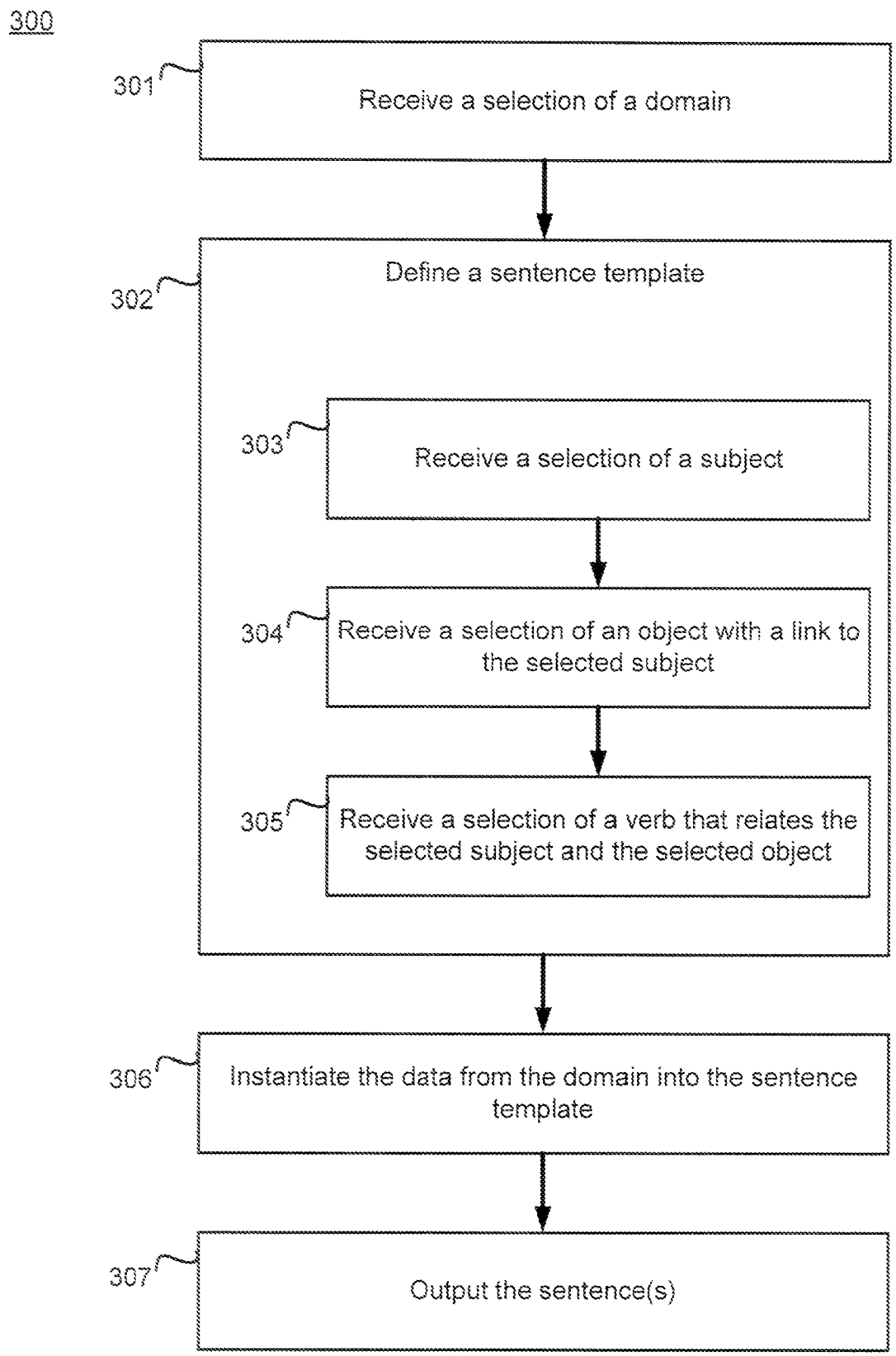
FIG. 3 is a flow chart illustrating a method of creating sentences from relationships between data objects, in accordance with an embodiment of the present invention.

FIG. 3 is a flow chart illustrating a method 300 of creating sentences from relationships between data objects, in accordance with an embodiment. Specific examples of the steps of the method are illustrated in the screen shots of the following figures.

Figure 4:
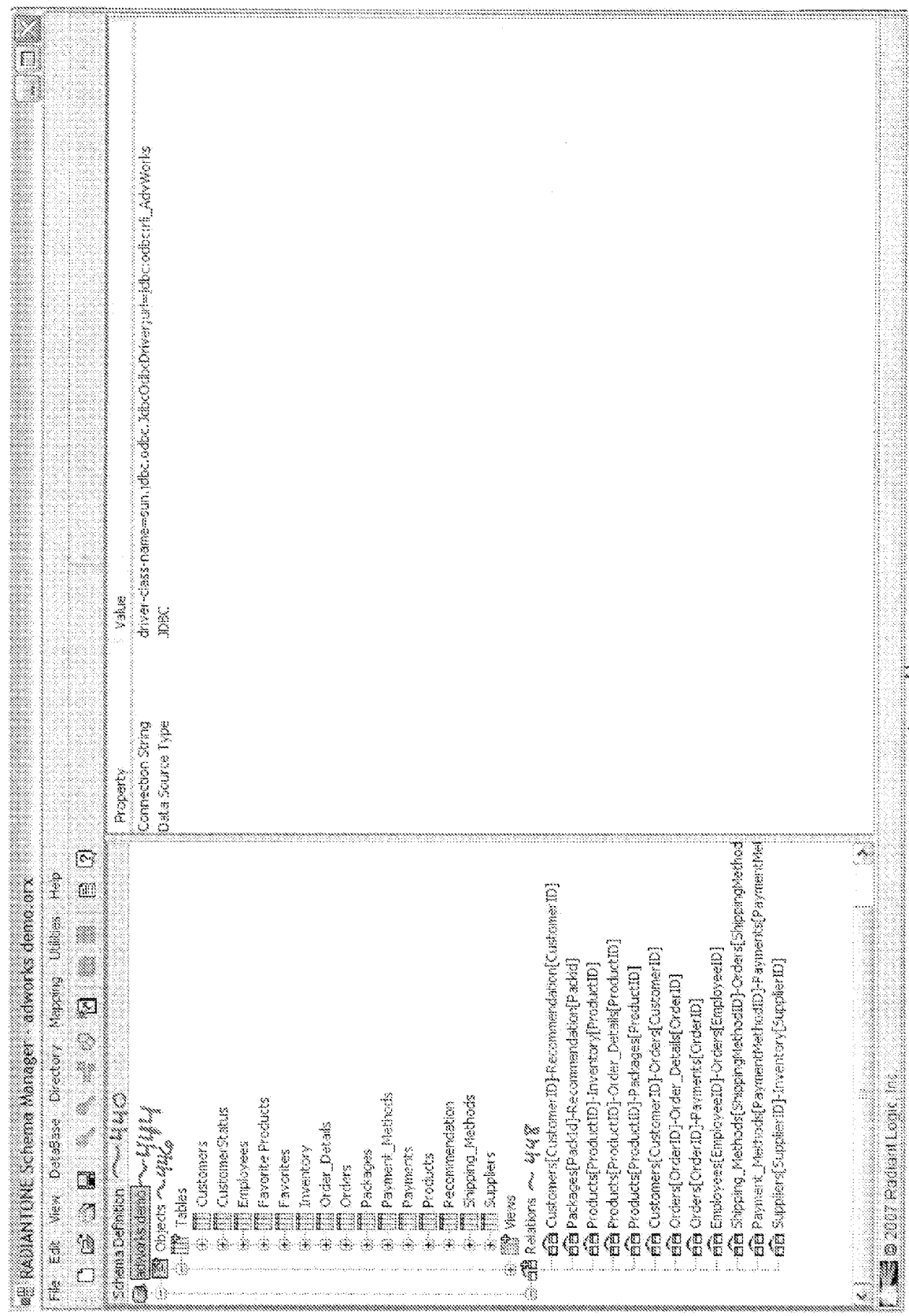
FIG. 4 is an illustration of a user interface including a schema manager, a tool to extract metadata from each application domain and translate it into a common (virtual) representation in accordance with an embodiment of the present invention.

In step 301, a selection of a domain is received. The initial selection of the domain indicates the starting point for the exploration of the relationships between data objects captured in the global model. In other words, the selection of the domain indicates what map will be used to create sentences. FIG. 4 is an illustration of a user interface including a schema manager, in accordance with an embodiment. FIG. 4 shows by the highlighting of adworks demo 444 that the user has made a selection of a domain within the schema definition window 440. Displayed under the domain name are a plurality of objects 446, including the tables within the domain, and the relations 448 between the objects that occur in the schema.

Referring back to FIG. 3, in step 302, the sentence template is defined. In one embodiment, the sentence template is defined by following steps 303-305 as described below. In this example, the sentence requires a subject of the sentence, an object of the sentence, and a verb that describes the relationship between subject and object of the sentence.

Figure 5:
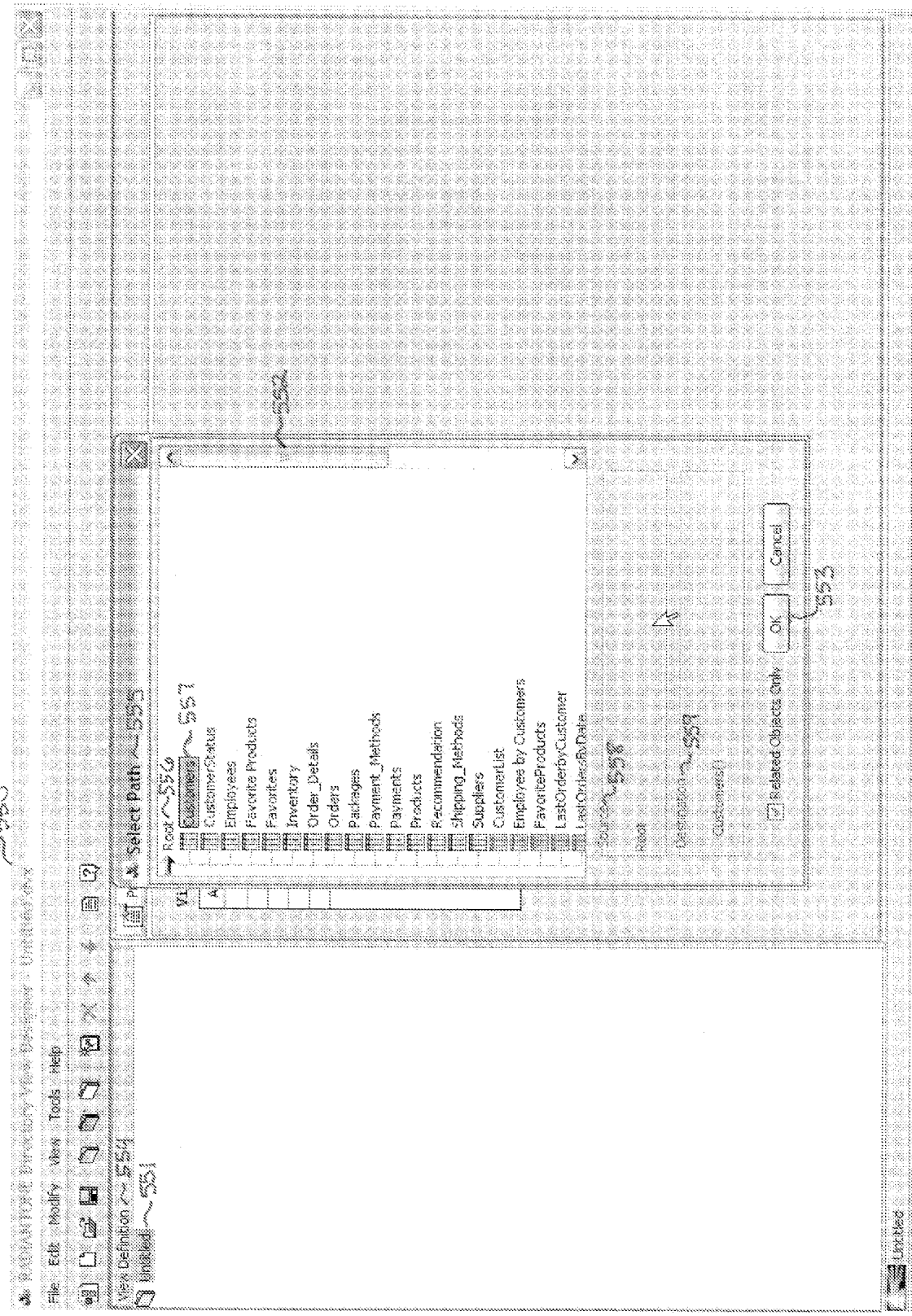
FIG. 5 is an illustration of a user interface including a directory view designer (sentence/context builder) and a path selection window, which shows the relationships (the graph path) existing between any selected objects and the rest of the objects in the global model, in accordance with an embodiment of the present invention.

In step 303, the selection of a subject is received. FIG. 5 is an illustration of a user interface including a directory view designer 550 and a path selection window 555, in accordance with an embodiment. The path selection window 555 allows the user to select a path from one data object to another. In this example, a new untitled view definition 551 is being created in the view definition window 554. The path begins at the root 556 and ends at the customers table 557, as indicated in the source identification box 558 and the destination identification box 559. As shown in the path selection window 555, the root 556 defines the top level of a hierarchical tree of data within the selected domain. The remainder of the tables in the second level of the hierarchical tree can be seen by scrolling down using scroll bar 552. In this example, from the displayed entities, the user has selected the customers table 557 as the subject to be used in the sentence template. The "Customers" subject 667 will then appear in the view definition 554, as shown in FIG. 6. The user is able to rename the subject 667 at will, for example to "Customer" to improve the grammar.

Figure 7:
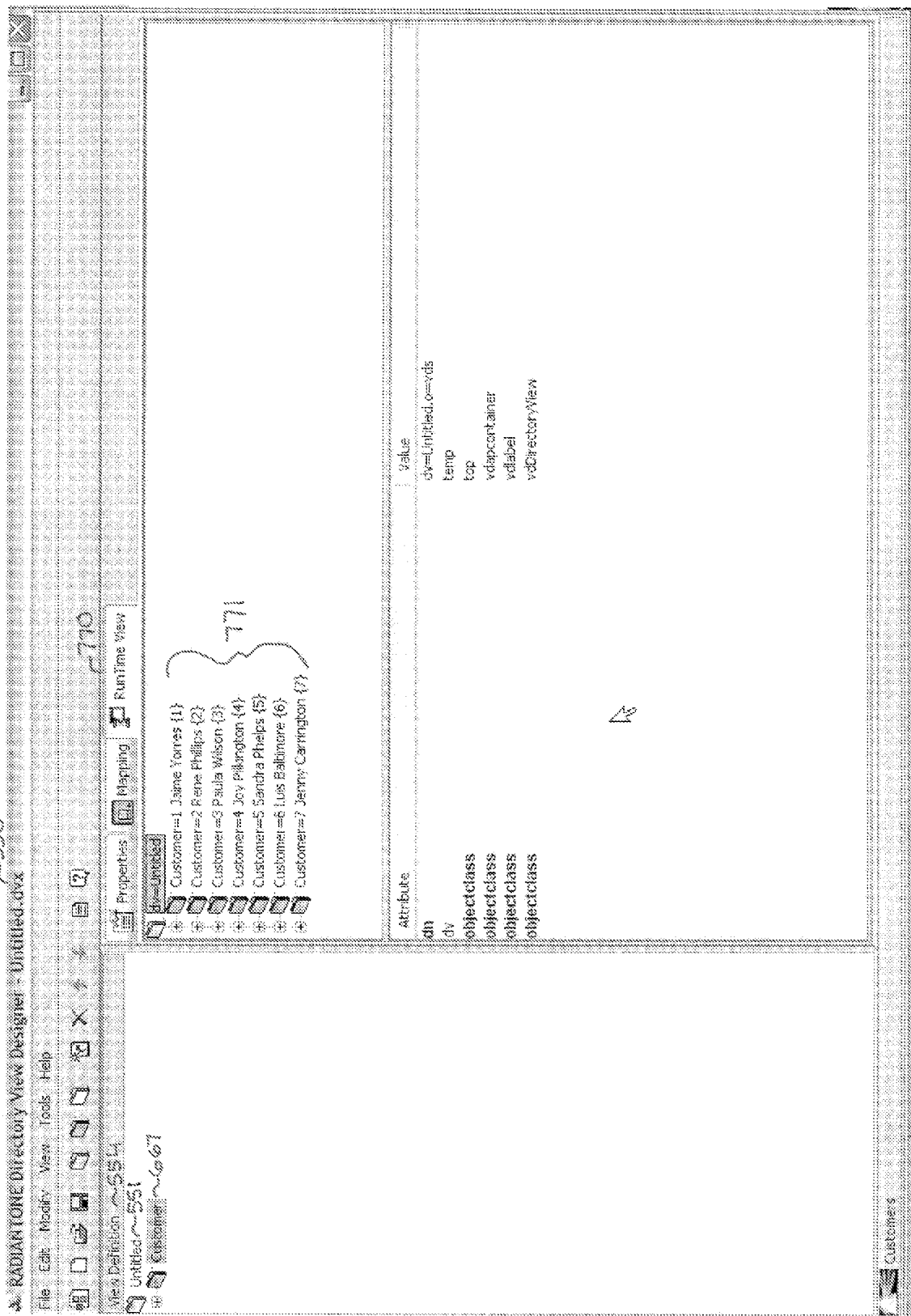
FIG. 7 is an illustration of a user interface for the mapping of the selected attributes from FIG. 6 in a window showing the different instances of customers displayed at runtime based on the template shown in FIG. 6.
Figure 8:
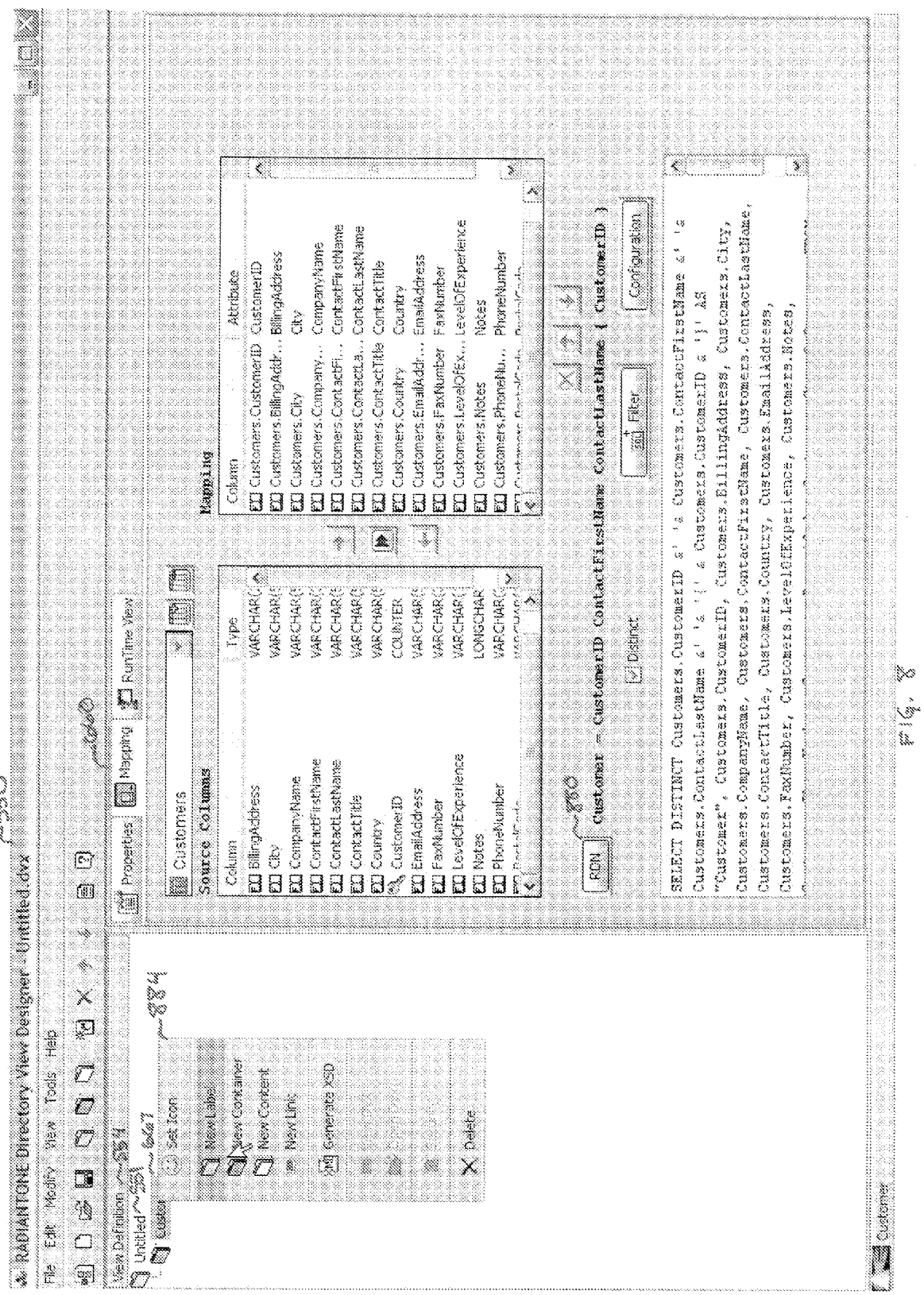
FIG. 8 is an illustration of a user interface of the directory view designer including a menu for selecting a new label, container, content, or link.
Figure 9:
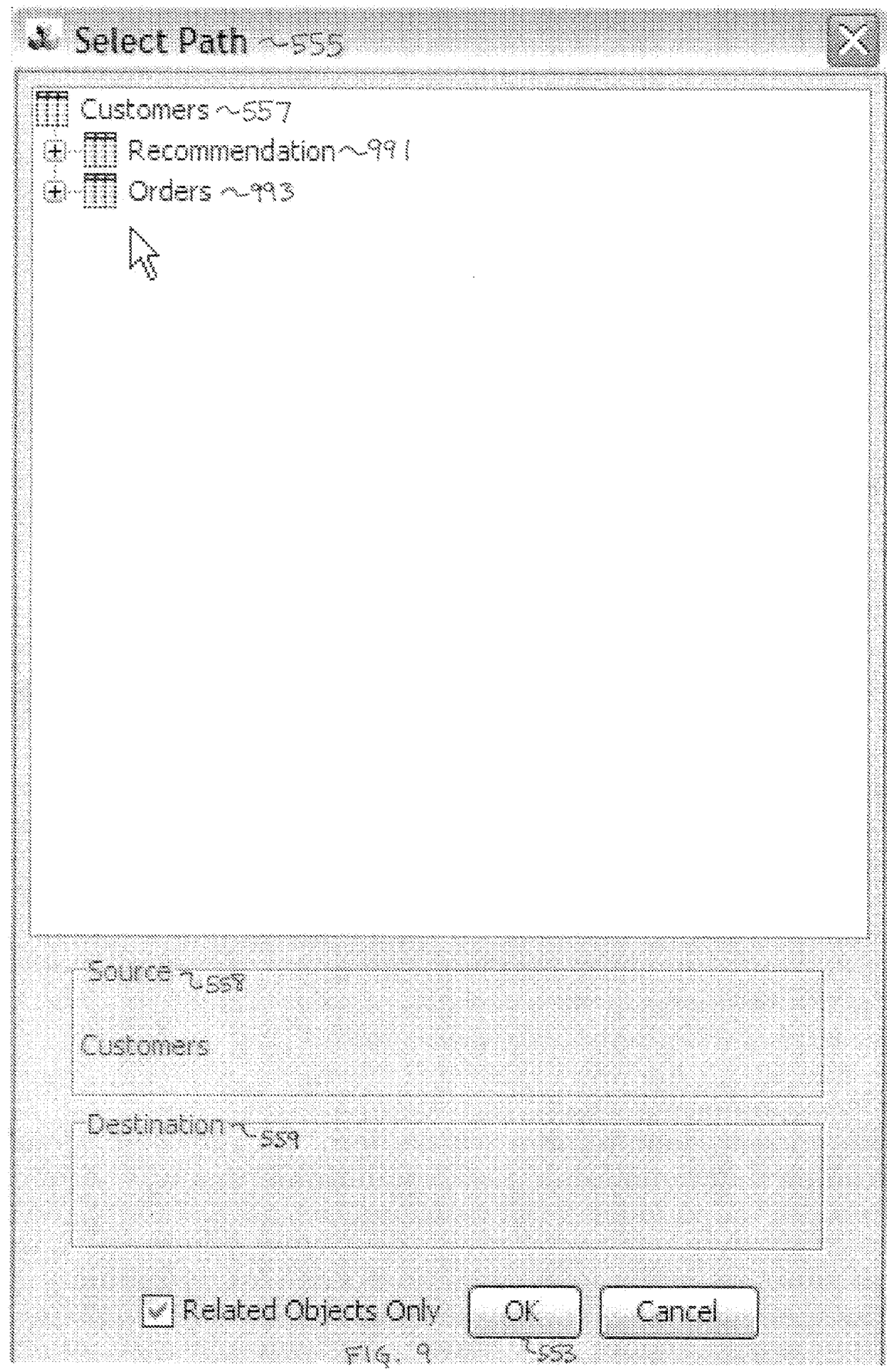

Optionally, the selection of the subject in step 303 may also include a selection of an identifier for the subject. This is illustrated in the user interface of FIG. 6, which includes a Relative Distinguished Name ("RDN") Columns window 662 for selecting attributes 664, 665, 666 from a selected table, in accordance with an embodiment. The window 662 includes a listing of all the columns and the mappings of those columns to attributes. A user can select one or more attributes in the list to identify the subject of the sentence by selecting the check boxes next to the appropriate item(s) in the list and selecting the OK button 669. FIG. 7 is an illustration of a user interface for the mapping of the selected attributes 664, 665, 666 from FIG. 6 in a RunTime View window 770 of the directory view designer 550. As selected by the user in this example, the customers are identified by customerID, ContactFirstName, and ContactLastName 771. Any other combination of attributes could also be used to identify the customers from the customer table for the purposes of building the sentence template. FIG. 8 shows the implications of the user's selection of attributes 664, 665, 666 as the RDN 880. If the user wants to select different attributes, the RDN Columns window can be accessed by selecting the RDN button 880.

Figure 9:
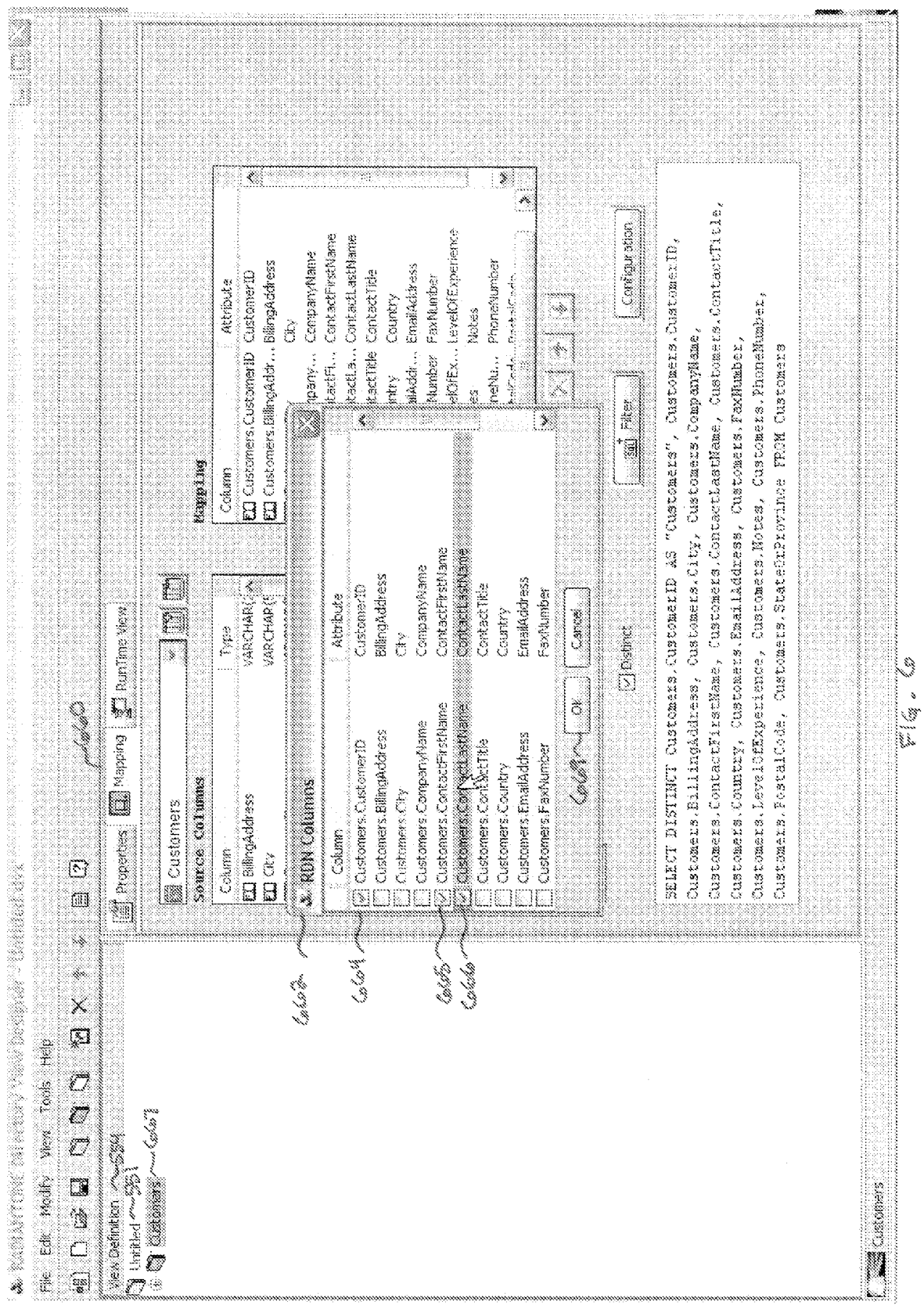
FIG. 9 is an illustration of a user interface for path/relationship selection between two objects, in accordance with an embodiment of the present invention.
Figure 10:
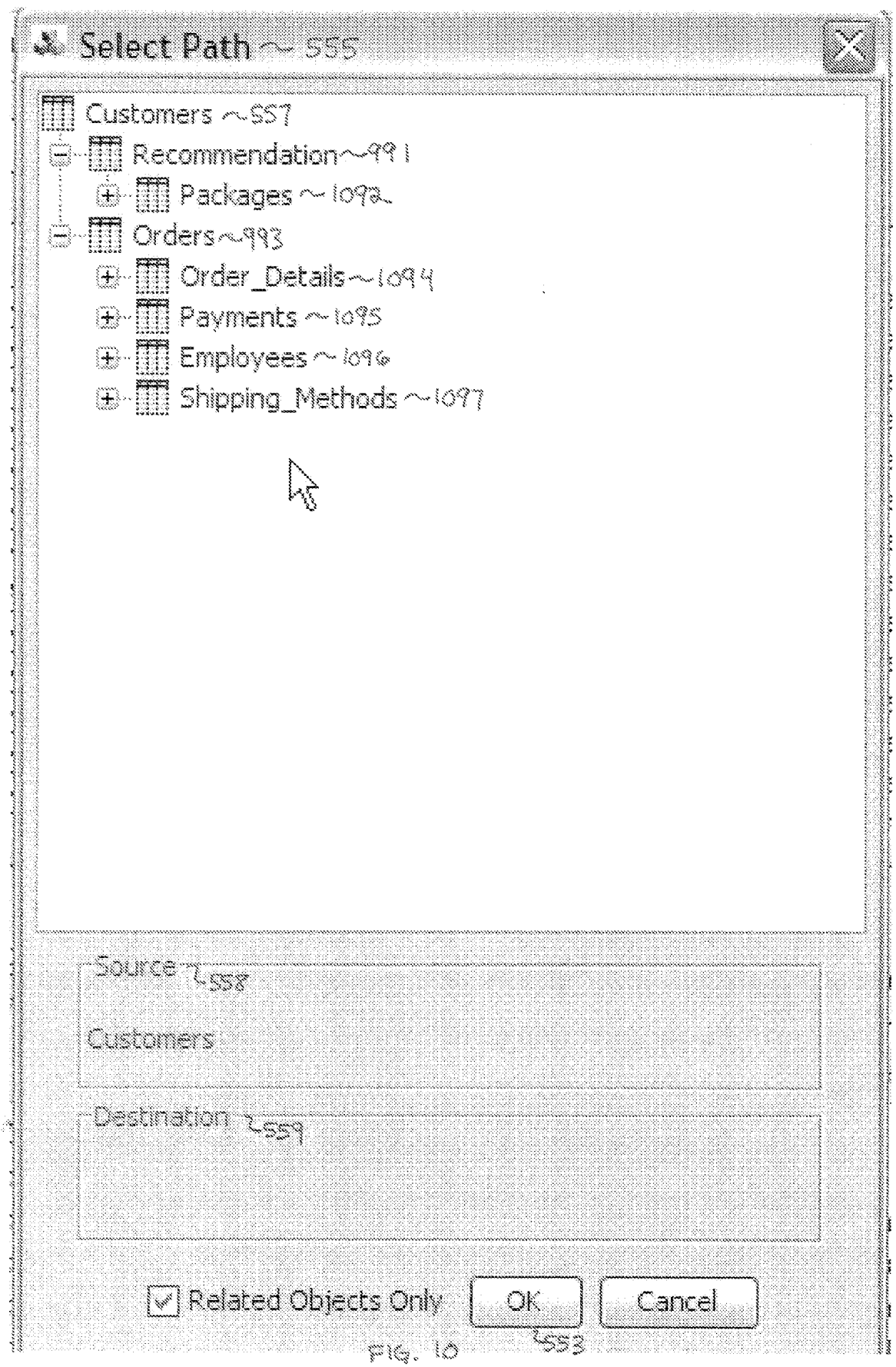
FIG. 10 is an illustration of the user interface for path selection of FIG. 9 with an expanded list of available paths showing the capability to link objects across many intermediate links (i.e., management of transitivity of links).

Referring to FIG. 3, in step 304, a selection of an object with a link to the selected subject is received. FIG. 8 is an illustration of a user interface of the directory view designer 550 including a menu 884 for selecting a new label, container, content, or link. In this example, a new container is selected. FIG. 9 is another illustration of a user interface for path selection 555, this time illustrating the objects that are linked to the customers table 557 through underlying relationships in the schemas of the data sources that were extracted to create the global model. As shown, the recommendation table 991 and the orders table 993 are both linked to the customers table 557. This time, the path begins at the customers table 557 as indicated in the source identification box 558. The user can drill down through the hierarchical paths between data objects, as illustrated by the expanded tree of FIG. 10. The tree structure represents the relationships extracted from the original data sources. As shown in FIG. 10, the recommendation table 991 is linked to the packages table 1092, and the orders table 993 is related to the order_details table 1094, the payments table 1095, the employees table 1096, and the shipping_methods table 1097. When the user makes selection as to the object that is linked to the selected customers subject, it appears in the destination identification box 559. The user is free to make a selection of an object one or more levels deep in the path hierarchy from the customers table 557 across many intermediate relationships because of the transitivity of links. For example, the user may select recommendation 991 as the object or packages 1092 as the object. As another example, if customers is linked to orders, which is linked to order details, which is linked to products, the navigation system enables the code for linking customers to the products directly.

Optionally, the selection of the object with a link to the selected subject in step 304 may also include a selection of an identifier for the object. The process is similar to the selection of an identifier for the subject described above with reference to FIG. 6. A user can select one or more attributes to identify the object of the sentence by selecting the check boxes next to the appropriate item(s) in the list. Any combination of attributes can be used to identify the subject for the purposes of building the sentence template.

Figure 11:
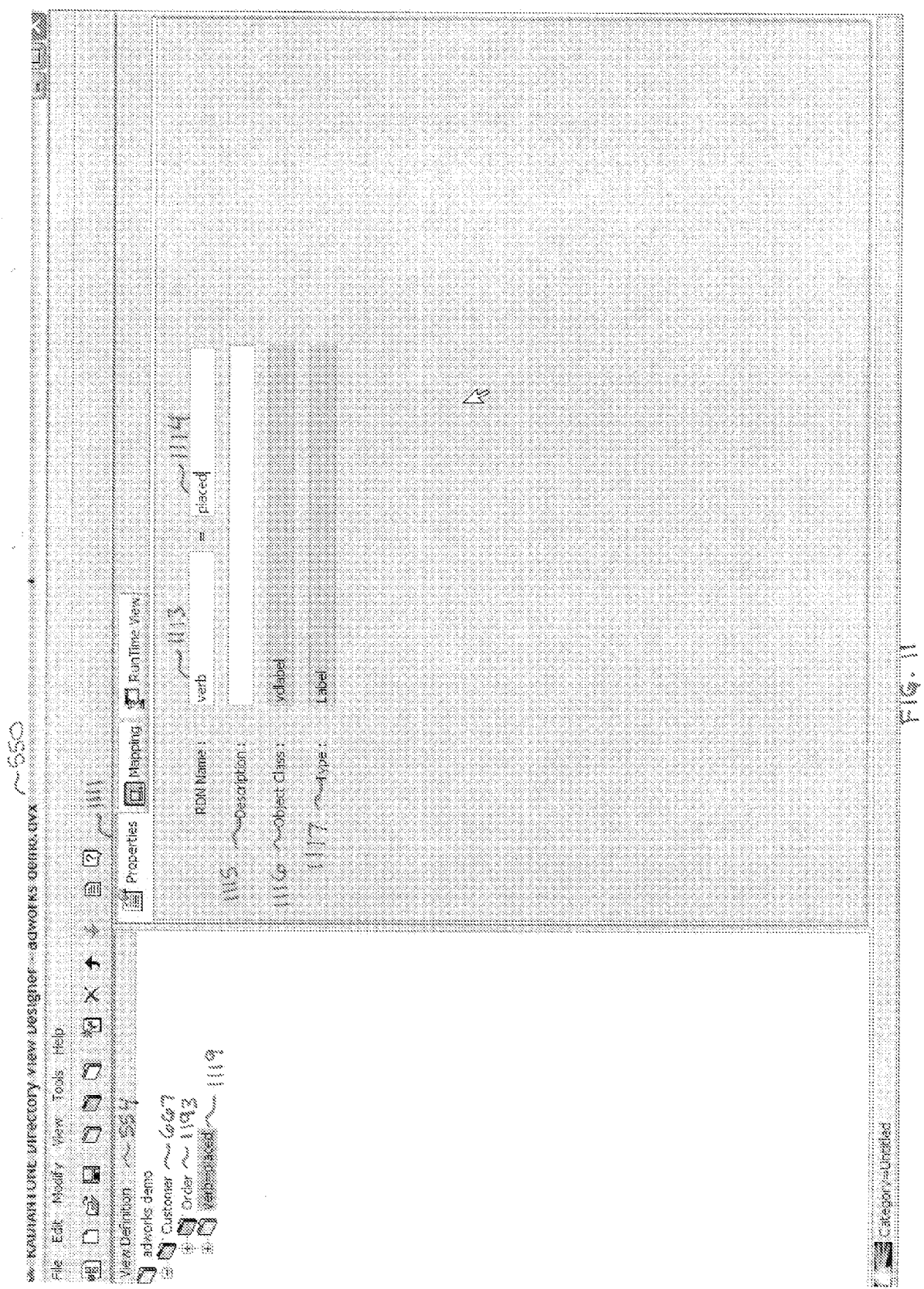
FIG. 11 is an illustration of a user interface for selecting a verb descriptive of the relationship between the data represented in the view definition, in accordance with an embodiment of the present invention.
Figure 10:
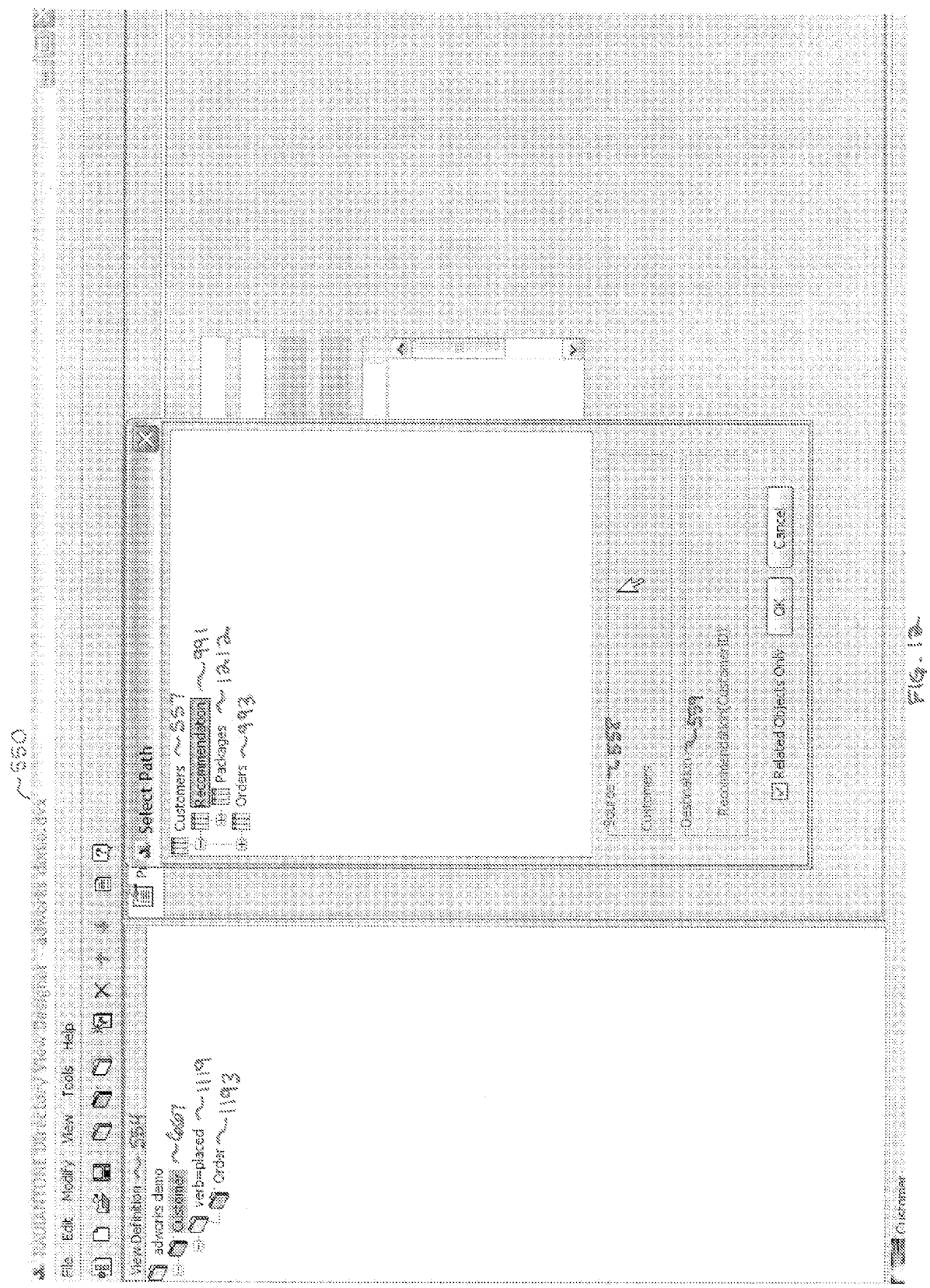

Referring to FIG. 3, in step 305, a selection of a verb that relates the selected subject and the selected object is received. FIG. 11 is an illustration of a user interface for selecting a verb 1114 descriptive of the relationship between the data represented in the view definition 554, in accordance with an embodiment. In the example shown herein, first a new label is created, for example by a user's selection of "New Label" from menu 884. A label is the mechanism used to tag the relationship (the verb) between two objects. The new label can then be relabeled by selecting the properties tab 1111 shown in FIG. 11. The properties tab 1111 of the interface is an editable form for editing the properties associated with a selected item in the view definition 554. As shown in the properties, the type 1117 is "Label" which signifies that the item is a label, and the object class 1116 is "vdlabel" which signifies that the new item is a view definition label. The user can type in the RDN name 1113 "verb" to indicate that the new label is a verb. The user can also type in the verb chosen to relate two of the items in the view definition 554. In this example, the user typed in "placed" to describe the relationship between the item "Customer" and the item "Order" in the view definition. In other embodiments, a user may select a verb from a drop down menu or via any other selection mechanism known to those of skill in the art. Once the new label has been created, the items in the view definition 554 can be organized and displayed according to the hierarchy presented in FIG. 12. Thus, according to the created sentence template, the subject customer 667 placed 1119 the object order 1193.

FIG. 12 is another illustration of the user interface including the path selection window in FIG. 5. In this example, the user has begun with the customers table 557 and has selected a path to the recommendation table 991 as is reflected in the source identification box 558 and destination identification box 559. Note that an equally valid path would have been from the customers table 557 to the packages table 1212 that is related to the customers table 557 through the recommendation table 991. As previously mentioned, the user need not be constrained to navigating one level of the hierarchy at a time.

Figure 13A:
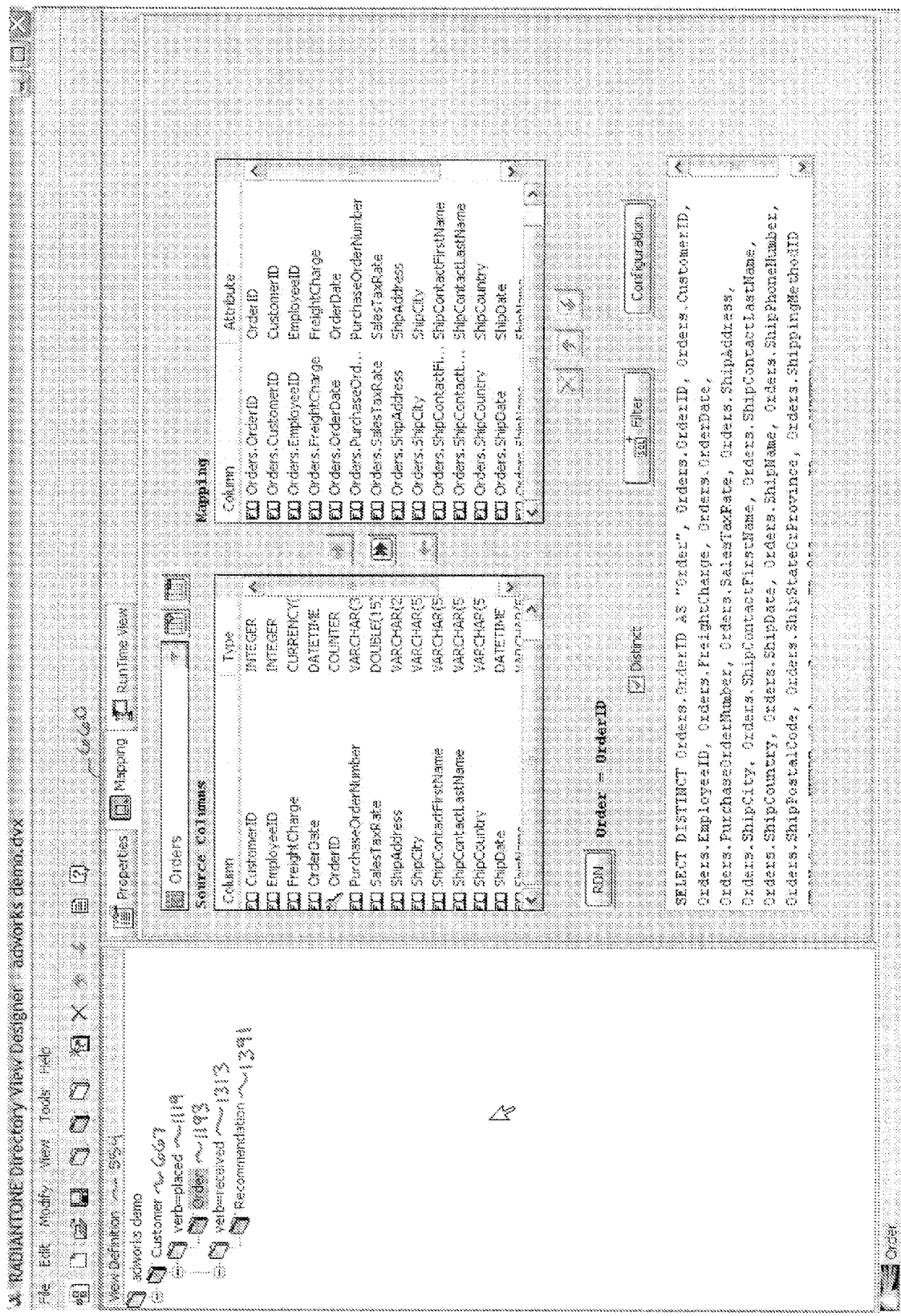
FIG. 13A is an illustration of a user interface after a second verb has been selected to relate an object and a subject in the view definition, in accordance with an embodiment of the present invention.
Figure 13C:
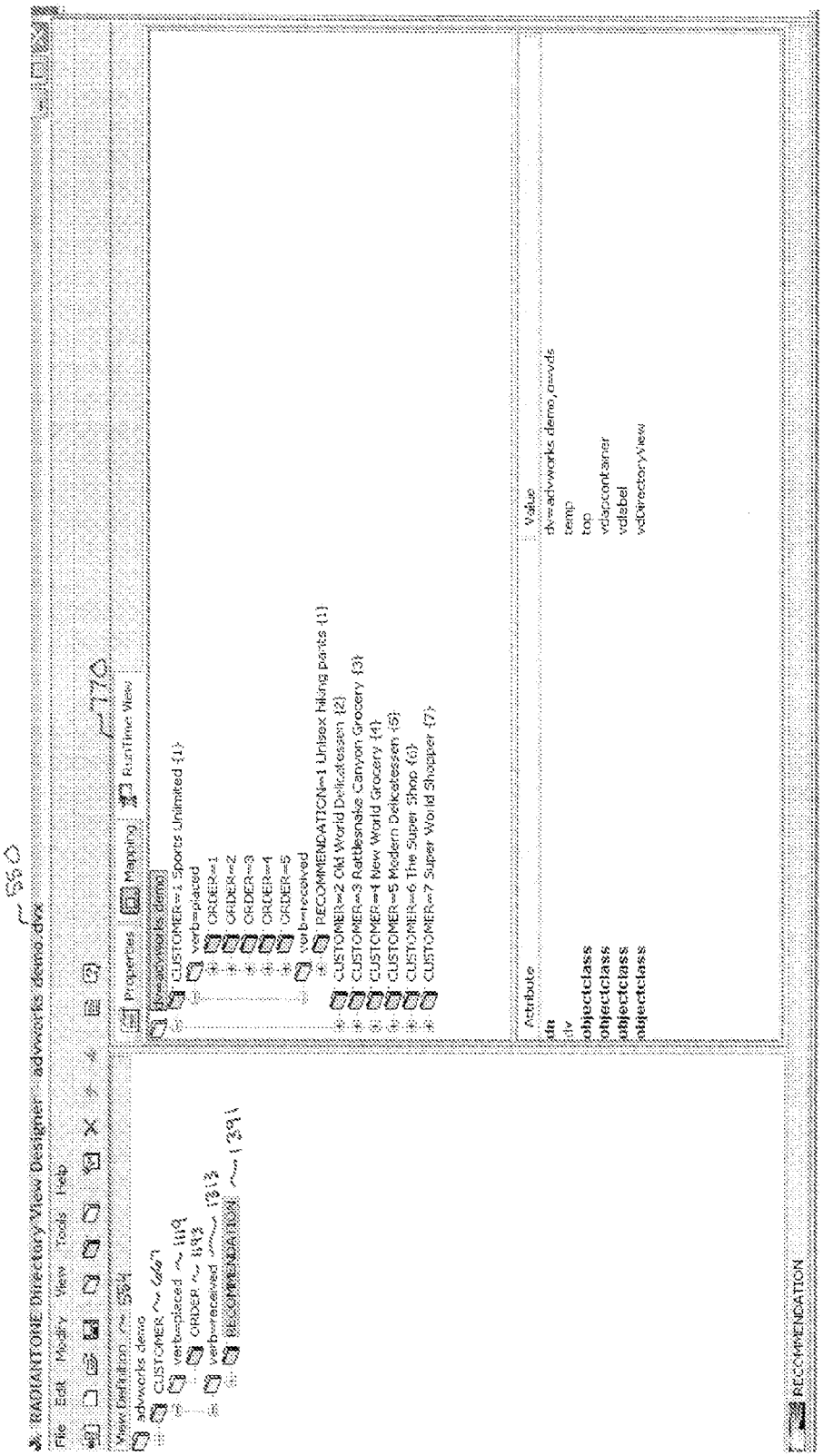
FIG. 13B illustrates completed sentence templates in the view definition and the RunTime View showing the substituted values into the sentence templates, in accordance with an embodiment of the present invention.

FIG. 13A is an illustration of a user interface after a second verb 1313 has been selected to relate a subject 667 and an object 1391 in the view definition 554, in accordance with an embodiment. FIG. 13A illustrates the building process for another sentence template. In this case, after the user has selected the subject of recommendation 1391. The verb "received" 1313 was selected to describe the relationship between the subject customer 667 and the object recommendation 1391. Then the items in the view definition 554 were organized according to the hierarchy presented in FIG. 13A. Thus, according to the second created sentence template, the subject customer 667 received 1313 the object recommendation 1391.

FIG. 13B illustrates completed sentence templates in the view definition 554 and the RunTime View 770 showing the substituted values into the sentence templates, in accordance with an embodiment of the present invention. To summarize, the view definition 554 is a tool to build the template of the sentence. In the examples shown, the templates are CUSTOMER verb=placed ORDER; and CUSTOMER verb=received RECOMMENDATION. At run time, shown by the RunTime View 770, this template is then substituted with the values from the data returned from a query to the various data sources to form the fully qualified sentence. In the example shown, Customer=1 Sports Unlimited verb=placed ORDER=1, etc.

Referring to FIG. 3, in step 306, the data from the domain is instantiated into the sentence template that has been defined by the selection of a subject, object, and verb in steps 303-305 above. Thus, the sentences are created. Examples of instantiated sentences according to various sample sentence templates are provided in FIG. 17 described below.

Referring to FIG. 3, in step 307, the sentences are output. The output sentences are human-readable, and easily interpreted as English language sentences by the user. The sentences can be output for display to the user, or output to a storage device, or output for encoding into another format, for example RDF. Thus, data originally from a variety of data sources including relational databases can be harvested into sentences which are then compatible with the Semantic Web protocols without needing to be encoded manually.

Figure 14:
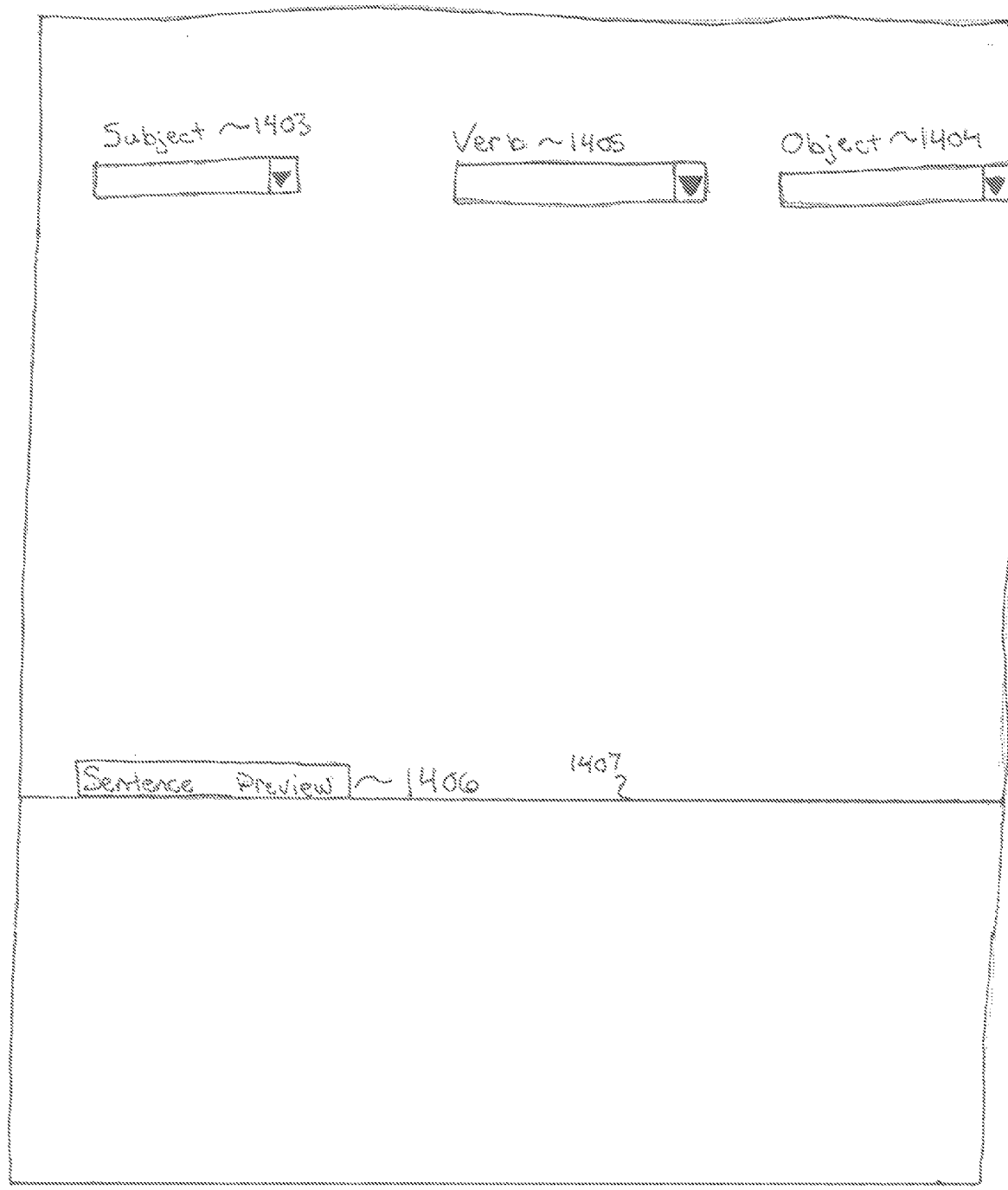
FIG. 14 is an illustration of an alternate user interface for building sentences from data objects.

FIG. 14 is an illustration of an alternate user interface for building sentences from data objects. In one embodiment, this is the user interface to the sentence/context builder 111 of the virtual directory/context server 110. The user interface includes a subject selection field 1403, a verb selection field 1405, and an object selection field 1404. In one embodiment, the drop down menu of the subject selection field 1403 includes all possible data objects, each having a distinguished name, in which to begin navigating the paths between the related data objects. After the subject is selected, in one embodiment, the object selection field 1404 would be populated with the potential objects for which there exists a path from the selected subject. Then, in one implementation, the verb selection field 1405 allows the user to select one of a plurality of verbs to describe the relationship between the selected subject and the selected object. In another implementation, the verb is already assigned by default based on pre-established identified relationships by an administrator. In other implementations, the default can be overridden by an explicit selection of another verb by a user.

Once the subject, object and verb have been selected, the user may select the sentence preview button 1406 to view, for example in window 1407, the instantiated sentences based on the sentence template that has been created.

Figure 15:
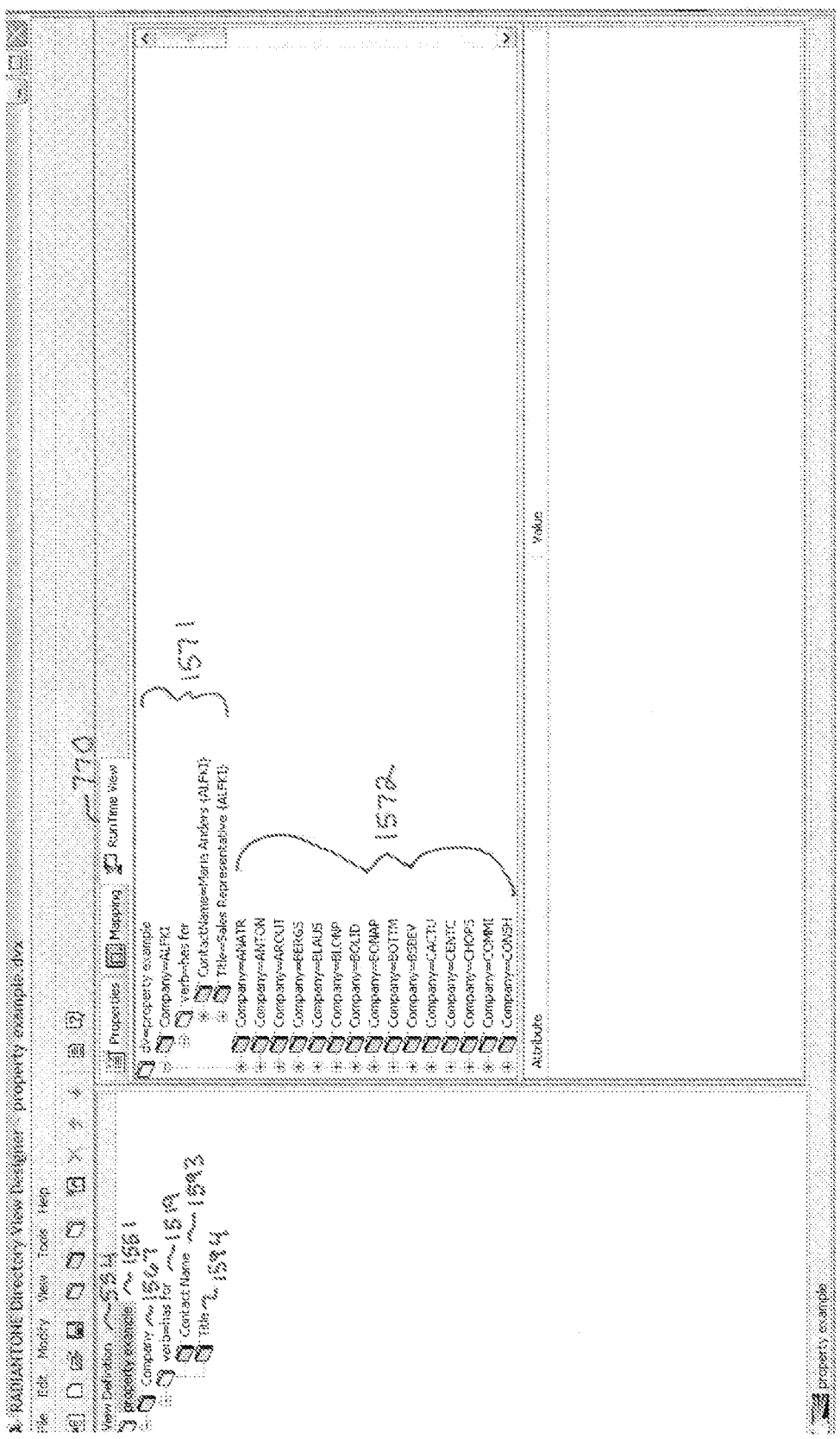
FIG. 15 is an illustration of a user interface displaying an example of tagging properties of an object, in accordance with an embodiment of the present invention.
Figure 16:
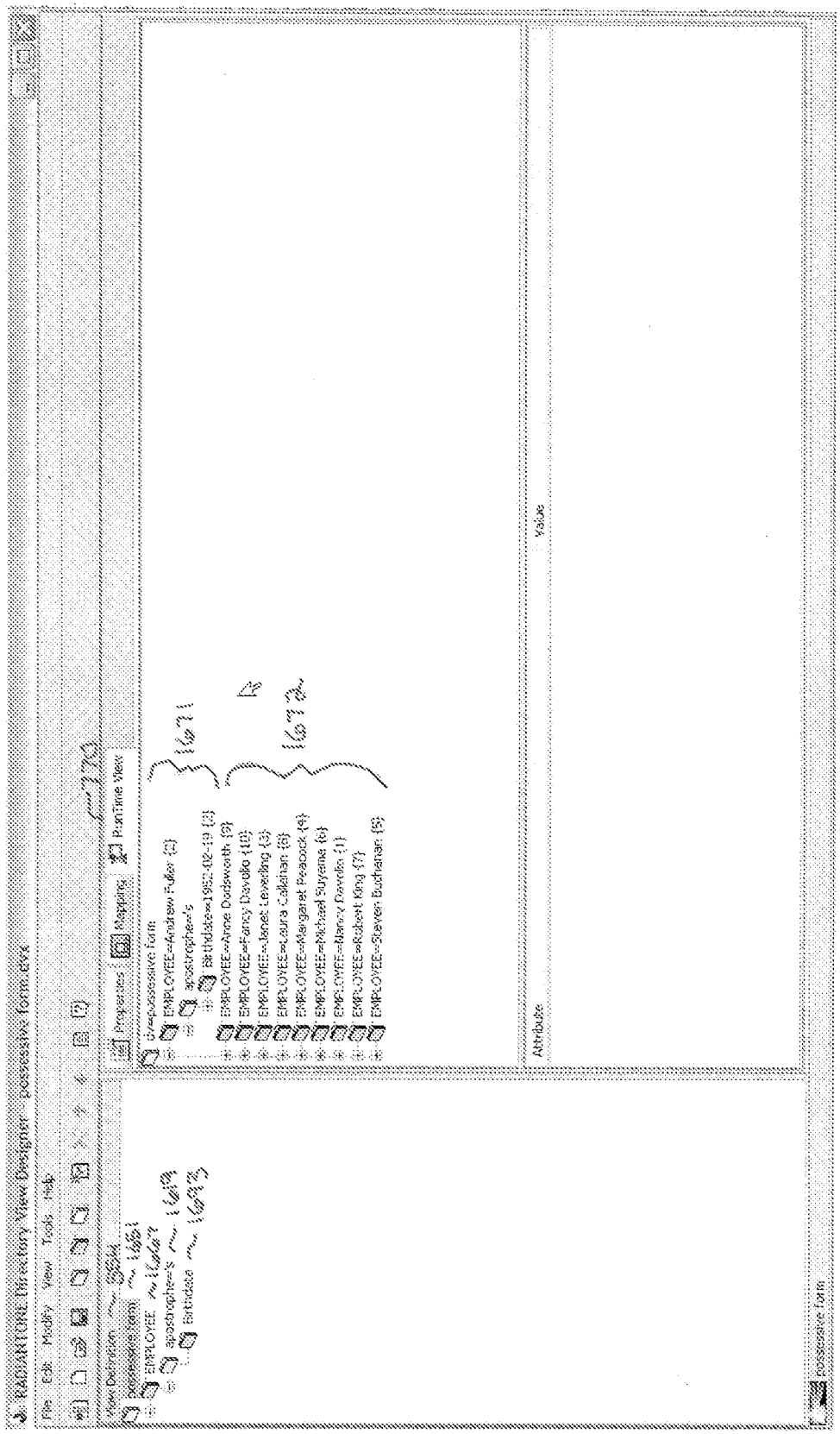
FIG. 16 is an illustration of a user interface displaying an example of tagging properties of an object by possessive form, in accordance with an embodiment of the present invention.

In the examples described above, the creation of sentence templates of the form subject-verb-object has been described. These sentences are one mechanism to describe the associations between a subject, which can be any object/entity of a given virtualized schema, and an object, which can be another object/entity of the same virtualized schema or another schema, by using a word that acts generally as a verb. The verb is defined by an annotated label or tag. In other embodiments of the invention, in addition to these types of relationships, other types of sentence templates, specifically those that describe the properties or attributes that are specific to an object or entity can also be created. These sentences link a subject, which can be any object/entity of a virtualized schema to an attribute of this object using an annotated label or tag which can be a verb, a qualifier, or as possessive form. Two examples of these types of sentence templates are shown in FIGS. 15 and 16. Other types of sentences and other ordering of sentence parts are also possible in other embodiments.

FIG. 15 is an illustration of a user interface displaying an example 1551 of tagging properties of an object, in accordance with an embodiment. In this example, company 1567 has already been selected as the subject of the sentence according to a similar method as described above with respect to FIGS. 3, 5, and 6. The subject 1567 is displayed in the view definition window 554. Contact Name 1593 and Title 1594 have already been selected as the properties of company 1567 according to a similar method as described above for selecting the object as described with respect to FIGS. 3 and 8-10. The properties Contact Name 1593 and title 1594 are displayed in the hierarchy in the view definition window 554. The verb 1519 has already been selected as the relationship between the subject 1567 of Company and the properties 1593, 1594 of Contact Name and Title. Thus, in the RunTime View window 770, an example of a sentence of this form is reflected in the hierarchy marked 1571. The user can interpret this portion of the hierarchy as "The company ALFKI has for a contact Maria Anders, Sales Representative." By drilling down within the remainder of the hierarchy 1572, other examples of sentences of this form are reflected in the hierarchy 1572. The items in the view definition 554 can be renamed by the user as desired to improve the readability and interpretation of the sentences or to clarify the meaning.

FIG. 16 is an illustration of a user interface displaying an example 1651 of tagging properties or attributes of an object by possessive form, in accordance with an embodiment. In this example, employee 1667 has already been selected as the subject of the sentence according to a similar method as described above with respect to FIGS. 3, 5, and 6. The subject 1667 is displayed in the view definition window 554. Birthdate 1693 has already been selected as the attribute of employee 1667 according to a similar method as described above for selecting the object as described with respect to FIGS. 3 and 8-10. The attribute of birthdate 1693 is displayed in the hierarchy in the view definition window 554. The connection between employee 1667 and birthdate 1693 has been selected to be as represented in possessive form by using an apostrophe s at the end of the employee. Thus, the label "apostrophe='s" 1619 has been selected by the user to convey the relationship between the employee and the employee's birthdate. Thus, in the RunTime View window 770, an example of a sentence of this form is reflected in the hierarchy marked 1671. The user can interpret this portion of the hierarchy as "The employee Andrew Fuller's birthdate is Feb. 19, 1952." By drilling down within the remainder of the hierarchy 1672, other examples of sentences of this form are reflected in the hierarchy 1672. Again, the items in the view definition 554 can be renamed by the user as desired to improve the readability and interpretation of the sentences or to clarify meaning.

The examples above have been used to describe a variety of methods by which a user can create sentences from the relationships between objects, and relationships between objects and their properties or attributes. Not all sentences that can possibly be created from the schemas of the data sources are meaningful enough to spend resources to create. Among the most important sentences are those that describe the main business processes of the enterprise, such as sales matters, human resources matters, and the like. In the embodiments described herein, it is left to the user to determine which relationships to represent as sentences. Once the data from data sources 101A-D of an enterprise 100 have been represented as sentences, the sentences can be indexed and searched according to any index and search techniques known to those of ordinary skill in the art.

FIG. 17 is an illustration of instantiated sentences 1721 returned as results from a keyword search, in accordance with an embodiment. A user has entered a keyword 1717 to search for a customer known by "customerid=alfk*" and selected the search button 1718. In the Contexts found listing 1720, all instantiated sentences 1721 having an attribute that matches "customerid=alfk*" are returned. In this example, customerid=alfk* is an attribute of the customer Alfreds Futterkiste. In a standard search using traditional methods, only objects that have the attribute "customerid=alfk*" directly attached to them would be returned. For example, a traditional search would only return the table that relates the customer Alfreds Futterkiste to a customerid. However, because the sentences that represent relationships between data according to the global model are also indexed according to the present invention, the search results in the Contexts found listing 1720 includes the sentences 1721 that refer to Alfreds Futterkiste, the customer matching customerid=alfk*, along with the context in which the customer is found. In a glance, the user can read and interpret the several contexts in which the customer appears. In this example, Alfreds Futterkiste has placed several orders, and several employees have sold several different products to him. Thus, a contextual search for the customer having the customerid alfk* is enabled, without the user performing the search having any prior knowledge of how the underlying data sources are organized or related.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A method of building a sentence template from database relationships, the method comprising:
   receiving a selection of a domain having a global data model;
   defining the sentence template by:
      displaying a first plurality of entities within the selected domain;
      receiving a selection of a subject for the sentence template from among the first plurality of entities;
      displaying a second plurality of entities related to the subject of the sentence template according to relationships derived from the global data model;
      receiving a selection of an object for the sentence template from the second plurality of entities related to the subject of the sentence template according to the relationships derived from the global data model; and
      responsive to receiving the selection of the subject for the sentence template and the selection of the object for the sentence template, receiving a selection of a verb for the sentence template to establish a description of a relationship between the subject and the object of the sentence template; and
   displaying the selected subject, the selected verb, and the selected object in order as the sentence template.

2. The method of claim 1, wherein the global data model comprises a mapping of relationships between diverse data sources of an enterprise.

3. The method of claim 1, further comprising instantiating sentences based on data from the domain according to the sentence template.

4. The method of claim 3, further comprising outputting the instantiated sentences.

5. The method of claim 3, wherein the instantiated sentences are human-readable.

6. The method of claim 3, further comprising encoding the instantiated sentences into RDF format.

7. The method of claim 3, further comprising indexing the instantiated sentences to enable contextual searches.

8. The method of claim 7, further comprising responsive to a keyword search, returning instantiated sentences related to the keyword as search results.

9. The method of claim 1, wherein displaying the selected subject, the selected verb, and the selected object in order as the sentence template comprises displaying the selected subject, the selected verb, and the selected object in a hierarchy.

10. A method of building a sentence template from database relationships, the method comprising:
   receiving a selection of a domain having a global data model;
   defining the sentence template by:
      displaying a plurality of entities within the selected domain;
      receiving a selection of a subject for the sentence template from among the first plurality of entities;
      displaying a plurality of properties of the selected subject according to relationships derived from the global data model;
      receiving a selection of a property for the sentence template from the plurality of properties of the selected subject; and
      responsive to receiving the selection of the subject for the sentence template and the selection of the property for the sentence template, receiving a selection of a verb for the sentence template to establish a description of a relationship between the subject and the property; and
   displaying the selected subject, the selected verb, and the selected property in order as the sentence template.

11. The method of claim 10, wherein the global data model comprises a mapping of relationships between diverse data sources of an enterprise.

12. The method of claim 10, further comprising instantiating sentences based on data from the domain according to the sentence template.

13. The method of claim 12, further comprising outputting the instantiated sentences.

14. The method of claim 12, wherein the instantiated sentences are human-readable.

15. The method of claim 12, further comprising encoding the instantiated sentences into RDF format.

16. The method of claim 12, further comprising indexing the instantiated sentences to enable contextual searches.

17. The method of claim 16, further comprising responsive to a keyword search, returning instantiated sentences related to the keyword as search results.

18. The method of claim 10, wherein displaying the selected subject, the selected verb, and the selected property in order as the sentence template comprises displaying the selected subject, the selected verb, and the selected property in a hierarchy.

19. A method of building a sentence template from database relationships, the method comprising:
receiving a selection of a domain having a global data model;
defining the sentence template by:
displaying a plurality of entities within the selected domain;
receiving a selection of a subject for the sentence template from among the first plurality of entities;
displaying a plurality of attributes of the selected subject according to relationships derived from the global data model; and
receiving a selection of an attribute for the sentence template from the plurality of attributes of the selected subject; and
displaying the selected subject in the possessive form and the selected attribute in order as the sentence template, wherein the selected subject and the selected attribute are displayed in a hierarchy.

20. The method of claim 19, wherein the global data model comprises a mapping of relationships between diverse data sources of an enterprise.

21. The method of claim 19, further comprising instantiating sentences based on data from the domain according to the sentence template.

22. The method of claim 21, further comprising outputting the instantiated sentences.

23. The method of claim 21, wherein the instantiated sentences are human-readable.

24. The method of claim 21, further comprising encoding the instantiated sentences into RDF format.

25. The method of claim 21, further comprising indexing the instantiated sentences to enable contextual searches.

26. The method of claim 25, further comprising responsive to a keyword search, returning instantiated sentences related to the keyword.

27. A computer program product for building a sentence template from database relationships, the computer program product stored on a computer readable medium, and adapted to perform the operations of:
receiving a selection of a domain having a global data model;
defining the sentence template by:
displaying a first plurality of entities within the selected domain;
receiving a selection of a subject for the sentence template from among the first plurality of entities;
displaying a second plurality of entities related to the subject of the sentence template according to relationships derived from the global data model;
receiving a selection of an object for the sentence template from the second plurality of entities related to the subject of the sentence template according to the relationships derived from the global data model; and
responsive to receiving the selection of the subject for the sentence template and the selection of the object for the sentence template, receiving a selection of a verb for the sentence template to establish a description of a relationship between the subject and the object of the sentence template; and
displaying the selected subject, the selected verb, and the selected object in order as the sentence template.

28. A computer program product for building a sentence template from database relationships, the computer program product stored on a computer readable medium, and adapted to perform the operations of:
receiving a selection of a domain having a global data model;
defining the sentence template by:
displaying a plurality of entities within the selected domain;
receiving a selection of a subject for the sentence template from among the first plurality of entities;
displaying a plurality of properties of the selected subject according to relationships derived from the global data model;
receiving a selection of a property for the sentence template from the plurality of properties of the selected subject; and
responsive to receiving the selection of the subject for the sentence template and the selection of the property for the sentence template, receiving a selection of a verb for the sentence template to establish a description of a relationship between the subject and the property; and
displaying the selected subject, the selected verb, and the selected property in order as the sentence template.

29. A computer program product for building a sentence template from database relationships, the computer program product stored on a computer readable medium, and adapted to perform the operations of:
receiving a selection of a domain having a global data model;
defining the sentence template by:
displaying a plurality of entities within the selected domain;
receiving a selection of a subject for the sentence template from among the first plurality of entities;
displaying a plurality of attributes of the selected subject according to relationships derived from the global data model;
receiving a selection of an attribute for the sentence template from the plurality of attributes of the selected subject; and
displaying the selected subject in the possessive form and the selected attribute in order as the sentence template, wherein the selected subject and the selected attribute are displayed in a hierarchy.

* * * * *